REMOTE SWITCH UNIT IN A COMMON CONTROL TELEPHONE SYSTEM

Filed Nov. 23, 1965

INVENTORS
T. E. BROWNE
W. B. GAUNT, JR.
K. GOLDSCHMIDT
F. S. VIGLIANTE
O. H. WILLIFORD
R. K. YORK
BY
R. C. Winter
ATTORNEY Feb. 4, 1969 T. E. BROWNE ETAL 3,426,158

REMOTE SWITCH UNIT IN A COMMON CONTROL TELEPHONE SYSTEM

Filed Nov. 23, 1965 Sheet 5 of 15

Feb. 4, 1969 T. E. BROWNE ETAL 3,426,158

REMOTE SWITCH UNIT IN A COMMON CONTROL TELEPHONE SYSTEM

Filed Nov. 23, 1965 Sheet 6 of 15

Feb. 4, 1969 T. E. BROWNE ETAL 3,426,158

REMOTE SWITCH UNIT IN A COMMON CONTROL TELEPHONE SYSTEM

Filed Nov. 23, 1965

Feb. 4, 1969 T. E. BROWNE ETAL 3,426,158

REMOTE SWITCH UNIT IN A COMMON CONTROL TELEPHONE SYSTEM

Filed Nov. 23, 1965 Sheet 15 of 15

United States Patent Office 3,426,158

Patented Feb. 4, 1969

3,426,158
REMOTE SWITCH UNIT IN A COMMON CONTROL TELEPHONE SYSTEM

Thomas E. Browne, Red Bank, Wilmer B. Gaunt, Jr., and Karl Goldschmidt, New Shrewsbury, and Frank S. Vigliante, Piscataway Township, Middlesex County, N.J., Oscar H. Williford, Bronxville, N.Y., and Robert K. York, Piscataway Township, Middlesex County, N.J., assignors to Bell Telephone Laboratories, Incorporated, New York, N.Y., a corporation of New York Filed Nov. 23, 1965, Ser. No. 509,375
U.S. Cl. 179—27 17 Claims
Int. Cl. H04m 3/00

This invention relates to communication switching systems and more particularly to switching facilities in an electronic private branch exchange system.

Private branch exchange systems, termed PBX's hereinafter, are telephone switching systems which are designed to serve a relatively few extensions assigned to a single customer. Contemporary PBX's normally have the entire exchange equipment, including switching network and control circuitry, located on the customer's premises. Such an arrangement, however, fails to take advantage of the inherent high speed capabilities of currently available electronic control circuitry. The contrast is evident when comparing such PBX's with a system of the type which utilizes a common control unit for a plurality of PBX switch units.

Such an arrangement is disclosed, for example, by R. C. Gebhardt et al. in patent application Ser. No. 195,199, filed May 16, 1962, now Patent No. 3,225,144, issued Dec. 21, 1965. In this PBX, data is transmitted to a common control unit from a plurality of satellite switch units for processing, after which operating instructions are returned to the switch units for implementation. These instructions direct switching operations which serve to interconnect pairs of lines in communication on a time division basis. The switch unit thus may serve a single customer, and a number of customers may be served economically by a single common control unit.

Each switch unit in this arrangement is restricted to serving a maximum number of lines, the limit being dictated by the nature of the internal time division operation and not by control unit parameters. The control unit, utilizing electronic components, can tolerate many times the amount of traffic which a single switch unit can provide. Thus the particular advantage of the Gebhardt et al. arrangement lies in the ability of the common control unit to accommodate a large number of individual switch units.

Due to the inherent limitations on the switch unit, the requirements of a customer whose demand outgrows the upper limit on the input of the corresponding switch unit are not easily satisfied. For example, provision of a second switch unit to such a customer would prove uneconomical if only a few additional lines beyond the switch unit capacity were required at the present time. A line circuit for a time division switching network is relatively more expensive than that terminating on a space division switching network. Furthermore, trunking among switch units is at a premium, and the use of such trunks for interconnecting multiple switch units of the same customer would be wasteful. Similarly, since this system requires a distinct data link between the control unit and each switch unit, the number of data links connecting one customer's switch units to the control unit would be increased unnecessarily in that data link usage is such that a single link might control a plurality of switch units.

Another aspect of the problem involves traffic handling capacity. A switch unit may, for example, accommodate up to twenty-four simultaneous calls. Thus an additional switch unit on the customer's premises would enlarge the capacity to forty-eight simultaneous calls. However, this capacity is realized only when one of the parties to each call is located in the local PBX. As a practical matter, of course, a PBX customer will experience a large percentage of intra-PBX calls. From an equipment standpoint, each such intra-PBX call represents two simultaneous calls. Conceivably, then, the capacity of two or more switch units serving one PBX customer may be as low as twenty-four simultaneous calls, the same capacity as accommodated by a single switch unit, this situation existing whenever all of the calls at any particular time are intra-PBX calls.

Thus the principal problem for which this invention affords a solution is how to accommodate a PBX customer efficiently and economically in a system having a control unit common to a plurality of remote, time division switch units, when the customer requires a greater capacity than afforded by a single switch unit of the type disclosed by Gebhardt et al.

It is a general object of this invention to provide an improved private branch exchange switching system wherein the inherent capabilities of electronic control apparatus are fully utilized.

It is another object of this invention to improve the operation of the switch unit facility in a private branch exchange.

More particularly, it is an object of this invention to minimize the cost of expanding switch unit facilities available to a private branch exchange customer.

It is another object of this invention to increase the flexibility of private branch exchange systems.

These and other objects of this invention are achieved in one specific illustrative embodiment incorporated in a telephone system having a plurality of isolated switch units, each serving a plurality of telephone stations, the control functions of the switch units being performed by a common control facility remote from the switch units.

The switch unit of the instant embodiment employs time division multiplex switching, as described in the aforementioned Gebhardt et al. patent. The Gebhardt et al. arrangement accommodates up to twenty-four simultaneous conversations on the common bus. In order to increase this capacity to any substantial degree, some means other than higher frequency of use of the common bus is required. As noted previously, resort to additional switch units for a single customer is not a practical solution. According to one aspect of this invention, the problem is solved by providing a multistage time division switching network which arranges the lines and trunks in groups, each group having direct access to a distinct common bus, and providing an intergroup bus which is time shared by the group buses. Control of group and intergroup buses is implemented by a common switch control in the switch unit which, in turn, acts in response to orders received from the remote control unit.

Again in the Gebhardt et al. arrangement the switch unit contains separate and independently operated memory and related control facilities for implementing the switching and scanning functions, respectively, the latter serving to detect the current state of each line in a regular sequence and to report all changes in state to the remote control unit. Such separate facilities present additional problems in maintaining reliable performance in remote locations which can only be solved through redundancy. This expedient, of course, leads to a more expensive facility, which may not be justified in considering additional switch units for a single customer. Therefore, according to another aspect of this invention, a single memory serves a large capacity switch unit and a single control arrangement has access to the memory for directing all operations in the switch unit.

Control of the attendants' consoles is similar to that described by Gebhardt et al. However, the combined memory concept again is used to advantage in this regard. Thus the memory stores all data concerning attendant lamps which afford an instant visual display of the status of each PBX call involving an attendant. The particular manner of lamp control also is of interest in that it permits the independent control of two attendant lamps via a single switch during the same time interval, thus affording a substantial saving in lamp control circuitry.

The independent scan technique utilized by Gebhardt et al. permits lines to be interrogated independent of the time division line gate operation. However, advantage is taken of the combined control of scanning and switching functions in the arrangement according to this invention to combine these scanning and switching operations as well. Thus, in accordance with another aspect of the invention, the control signal which enables a particular line gate also serves as the scan signal to the corresponding line. The necessary circuitry for performing these operations is simplified in the combination by permitting the line to be sampled simultaneously with the corresponding scan circuit in what is termed the "silent interval," during which time it can have no effect on a talking connection.

It is a feature o fthis invention that a remote controlled switch unit comprise a two-stage switching network, each stage in turn utilizing time division switching techniques.

It is another feature of this invention that the switch unit contain a single memory and that switching and scanning functions be under the control of a common control facility which is served by a single memory.

It is yet another feature of this invention that control of attendant lamps be exercised by the common control facility served by the single memory.

More particularly, it is a feature of this invention that a pair of attendant lamps be controlled independently via a single switch during a single time slot in a repetitive cycle.

It is a further feature of this invention that circuitry be provided in the switch unit to permit performance of switching and scanning operations by the same control signals. F A complete understanding of this invention and of the above-noted and other features thereof may be gained from consideration of the following detailed description and the acompanying drawings, in which.

INDEX

| | Col. |
|---|---|
| (1) General description | 4 |
| (2) Switch unit | 5 |
| (3) Establishment of a call connection | 5 |
| (4) Switch store | 7 |
| (5) Switch control | 8 |
| (6) Scanner | 14 |
| (7) Group pretranslator | 16 |
| (8) Intergroup switch | 18 |
| (9) Line and trunk group circuit | 19 |
| (10) Tone and digit trunk group circuit | 19 |
| (11) Line circuit | 20 |
| (12) Attendant circuit | 21 |
| (13) Trunk circuits | 23 |
| (14) Transfer and alarm circuit | 25 |
| (15) Data modem | 26 |
| (16) Clock | 26 |

Figure 1:
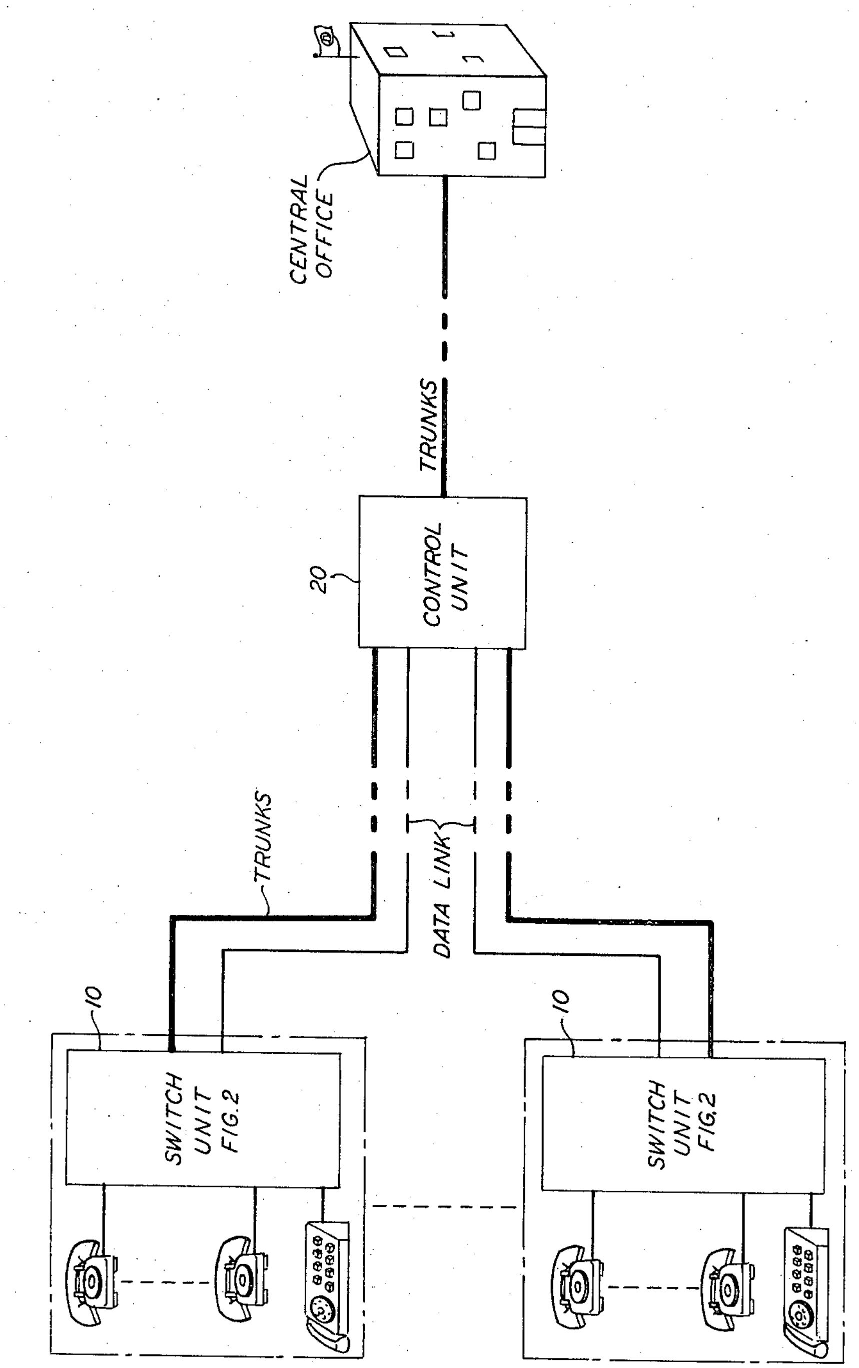
FIG. 1 is a block diagram representation of a private branch exchange system incorporating this invention.
Figure 2:
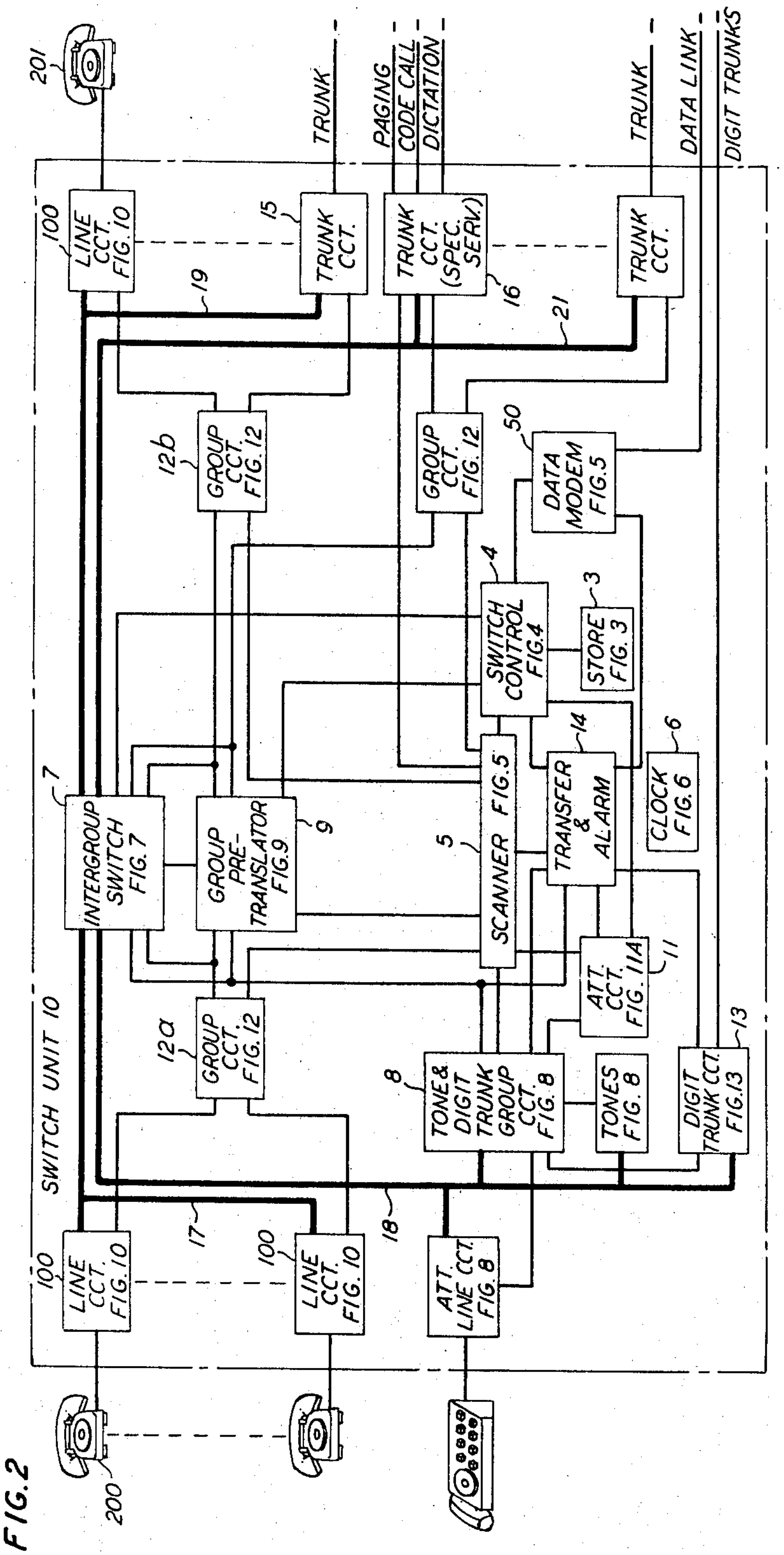
FIG. 2 is a block diagram representation of the switch unit in the private branch exchange system of FIG. 1.

(1) General description (FIGS. 1 and 2)

Turning now to the drawing, the principal characteristics of one switch unit and the control unit for the electronic PBX system incorporating the invention are illustrated in FIGS. 1 and 2, respectively.

The control unit is essentially as described in detail in E.L. Seley et al. application Ser. No. 252,797, filed Jan. 21, 1963, now F. S. Vigliante et al. patent No. 3,268,669, issued Aug. 23, 1966; and its relationship, systemwise, to the switch unit is described in detail in the aforementioned Gebhartd et al. patent, but for purposes of understanding the over-all system operation, a brief description of these units as contained in the Seley et al. and Gebhardt et al. applications is provided hereinafter.

Contrary to the characteristic operation of self-contained PBX's in which the transmission circuits, switching network and control apparatus are all located together on a customer's premises, a control unit 20 directs the call processing in all of the remotely located switch units 10 via corresponding data links. More specifically, a switch unit 10 informs the control unit 20 of all changes in the supervisory status of telephone lines, trunks and attendant console keys, e.g., whether they are idle (on-hook) or busy (off-hook). The control unit 20 then performs all of the decision-making tasks of call processing and directs the establishment of the connection of a calling party to a called party through the switching networks contained in each of the switch units 10.

Time division switching, which is utilized in each switch unit, is based on the principle that periodic samples of information from one source are sufficient to completely define the information and that such samples of information from a number of different sources may be transmitted in a regular sequence over a single path shared in time by all of the sources. Thus, for example, a plurality of stations such as telephone subsets 1*a*–1*n* in FIG. 1 are connected to a common bus in switch unit 10 through corresponding line gates which are sampled on a selective basis for a predetermined time interval in a recurrent cycle of time intervals. If a pair of gates is closed simultaneously for the prescribed time interval, thereby interconnecting a pair of stations, a sample of the information available at each station will be transferred to the other station via the common bus. A bilateral connection is thus established which, although physically connected for only a small fraction of the time, appears to the conversing parties to be continuously connected due to the smoothing action of filters associated with the line gates.

The number of simultaneous conversations which may be accommodated by the common bus is determined in part by the sampling rate required in order to provide a reproducible conversation. This sampling rate must be at least twice the maximum frequency to be transmitted. A 10 kilocycle sampling rate is quite common. Another factor to be taken into account is the length of the sampling interval or time slot. This interval must be sufficient to transfer samples of each party's conversation through the associated line gates without significant loss. A suitable transfer interval has been found to correspond to one half-cycle at the resonant frequency of the transfer circuit. These factors, together with others, establish the number of available time slots and thereby set a maximum on the number of stations which may be associated with the single common bus considering system traffic requirements. A system of the type disclosed in the aforementioned Gebhardt et al. patent utilizes twenty-five time slots and accommodates a maximum of twenty-four simultaneous conversations. The upper limit, as established by traffic requirements of the customer, might be in the neighborhood of 100 extension lines.

It is this limiting feature of the time division stage as the switching network of the PBX which has led to the instant invention. Heretofore if a customer's requirements were greater than the maximum allowable number of extension lines permitted by one switch unit, a second unit would be required on his premises although his needs might be for only a few additional lines beyond the capacity of one switch unit. The additional unit might afford only a slight increase in traffic handling capacity dependent upon the volume of intra-PBX calls. Also tie trunks between the first and second units would reduce the number of trunks available for connection to the central office.

(2) Switch unit (FIG. 2)

In accordance with our invention the switch unit terminates telephone lines and trunks on corresponding line circuits 100 and trunk circuits 15 arranged in groups, which groups in turn have access on a time division basis to corresponding common transmission buses, e.g., buses 17, 18, 19 and 21 shown in bold face in FIG. 2. The various line and trunk circuits are controlled through corresponding group circuits such as 12*a* and 12*b*. A second switching stage, identified as intergroup switch 7, serves to link active lines and/or trunks in different groups in an assigned time slot via the transmission buses.

Switch control 4 provides the essential control for the aforementioned switching network via group pre-translator 9 and corresponding group circuits 12 as well as intergroup switch 7. Switch control 4 transmits data to the control unit 20 via data modem 50 pertaining to the establishment of calls through the switch unit and receives from the control unit, again via data modem 50, instructions as to the particular switches to be operated in predetermined time slots to implement the call connections. Switch control 4 transmits this information to store 3 so that it will be available at each appearance of the assigned time slot in succeeding office cycles to effect the desired connections.

Scanner 5 performs the important function of continually observing the supervisory state of all lines and trunks. Upon detection of a change of state in any line or trunk, scanner 5 will detect this change and transmit the line identity to switch control 4 for subsequent establishment of a call connection or disconnection as the detected line or trunk condition may require.

An attendant's console has access to the common buses via tone and digit trunk group circuit 8 which contains the corresponding attendant's line circuit. Control of the attendant's line circuit is directed by attendant's circuit 111. Tone and digit trunk group circuit 8 also controls the various digit trunk circuits 13 and the application of various tones required in the establishment of call connections. Special services trunk circuits 16 accommodate system requirements for the various special services available to the private branch exchange such as paging, code call and dictation.

Many of the controls are duplicated in the switch unit for reliability. If some difficulty is encountered, transfer and alarm circuit 14 is activated to perform the substitution of a standby unit for the particular unit found to be at fault. A clock 6 develops all timing signals required by the switch unit.

(3) Establishment of a call connection (FIG. 2)

The general operation of the switch unit may best be understood from consideration of typical operations which it performs. Consider, for example, that the party at telephone 200 desires to talk to the party at telephone 201. The request for service, indicated by the handset being taken off-hook, is reflected in line circuit 100 of the calling party by the flow of line current producing a distinct voltage across a scan point contained therein.

Scanner 5 initiates the sequential interrogation of each line and trunk during a particular pair of time slots dedicated to the scanning function in each office cycle. The address of a single scan point, in this instance of a line circuit 100, is transmitted from scanner 5 to switch control 4 where it is treated the same as a line or trunk number during the scanning time slots.

Thus in accordance with one aspect of this invention, the switch control and translation circuitry provided for operation of the transmission gates in the line and trunk circuits is also utilized to perform the scanning function. The address is translated in group pretranslator 9, and a signal is transmitted through group circuit 12a to the calling line circuit 100. This signal would normally enable the transmission gate therein. However, in a scanning time slot all transmission gate operation is disabled, so that the appearance of this signal in a scanning time slot serves only to interrogate the scan point in the line circuit for service requests. A pulse indicating the off-hook condition of this line circuit 100 is then transmitted to scanner 5.

In accordance with another aspect of this invention, in the second time slot in the office cycle devoted to scanning, the previous state of line circuit 100 is retrieved from store 3 and compared with the current state in scanner 5. In this instance the comparison will indicate a change of status, so that in the following cycle a message for control unit 20 will be formulated in the first scanning time slot. Scanner 5 is inhibited from performing further scanning while the message is being transmitted to the control unit a bit in each of several consecutive cycles, as controlled by the data modem, from store 3 via switch control 4 and data modem 50. Upon transmittal of the last message bit to the control unit, the scanning operation is reinitiated.

The control unit recognizes the message as a service request and proceeds to select an idle time slot and digit trunk to accommodate this call. A message is returned to the switch unit containing the designation of telephone 200 as the calling party and digit trunk circuit 13 as the called party, together with the selected idle time slot. This message is checked for parity in switch control 4 and located in store 3 in a position corresponding to the addressed time slot, thereby completing the message processing.

Each time this time slot is encountered in the office cycle through store 3, the message is read out to switch control 4, where it remains during subsequent translation and application of signals to the designated line, group and intergroup switches to effect the transfer of a time division sample between the calling line and the digit trunk. In this case group pretranslator 9 selects digit trunk circuit 13 through group circuit 8 and calling line circuit 100 through group circuit 12.

Intergroup switch 7 is also activated in this instance in order to operate the time division switches or gates connecting special group bus 18 to line group bus 17. A tone indicating the establishment of this connection is then transmitted from a tone source in the control unit 20 to telephone 200 via bus 18, intergroup switch 7, bus 17 and the calling line circuit 100 in the assigned time slot.

Signals of the TOUCH-TONE variety, identifying the called line, are transmitted through the time division transmission path in succeeding appearances of the assigned time slot. Rotary dial pulses, however, are sampled at the line circuit and transmitted to digit trunk circuit 13 via the scanner 5. Digit trunk circuit 13 is arranged to detect such rotary dial pulses and convert them to tone bursts for transmission to control unit 20.

When the control unit has received all of the digits identifying the called telephone, for example telephone 201, it will transmit a message via the data link and data modem 50 to switch control 4 containing the identity of calling telephone 200, called telephone 201, and the assigned time slot. Ringing signal is applied to the called line under control of this message. Upon answer by the called party, connections will be established in each subsequent appearance of the assigned time slot to permit transmission of voice signals between the active lines. This connection includes the corresponding line circuits 100, bus 17, intergroup switch 7 and bus 19. If the calling and called parties are located within the same group, the intragroup connection is established in a similar manner.

Calls involving trunks are handled much the same as those involving lines. However, in special instances, it is desirable to reduce the insertion loss of the system. This is accomplished by switching on a negative impedance voice band amplifier that is associated with the particular trunk having this feature. Because both shunt and series elements are employed, gain to reduce insertion loss is added and at the same time the system structural return loss is maintained at a high level.

Switching of the individual trunk amplifiers is controlled by the translation of specific bits in the switch store, which bits are part of the same talking time slot word for the trunk connection that is repetitively read out at the normal sampling frequency. Part of the translation is done by the group pretranslator circuit and the remainder by gates in the featured trunk circuit. In addition some trunk circuits employ negative impedance amplifiers that are not switchable. Thus, the insertion loss of the switch unit, when using these trunk circuits, is always near zero decibel and is offered for special applications.

Each of the switch unit components depicted in block form in FIG. 2 will now be considered in greater detail with reference to FIGS. 3 through 14.

Figure 3:
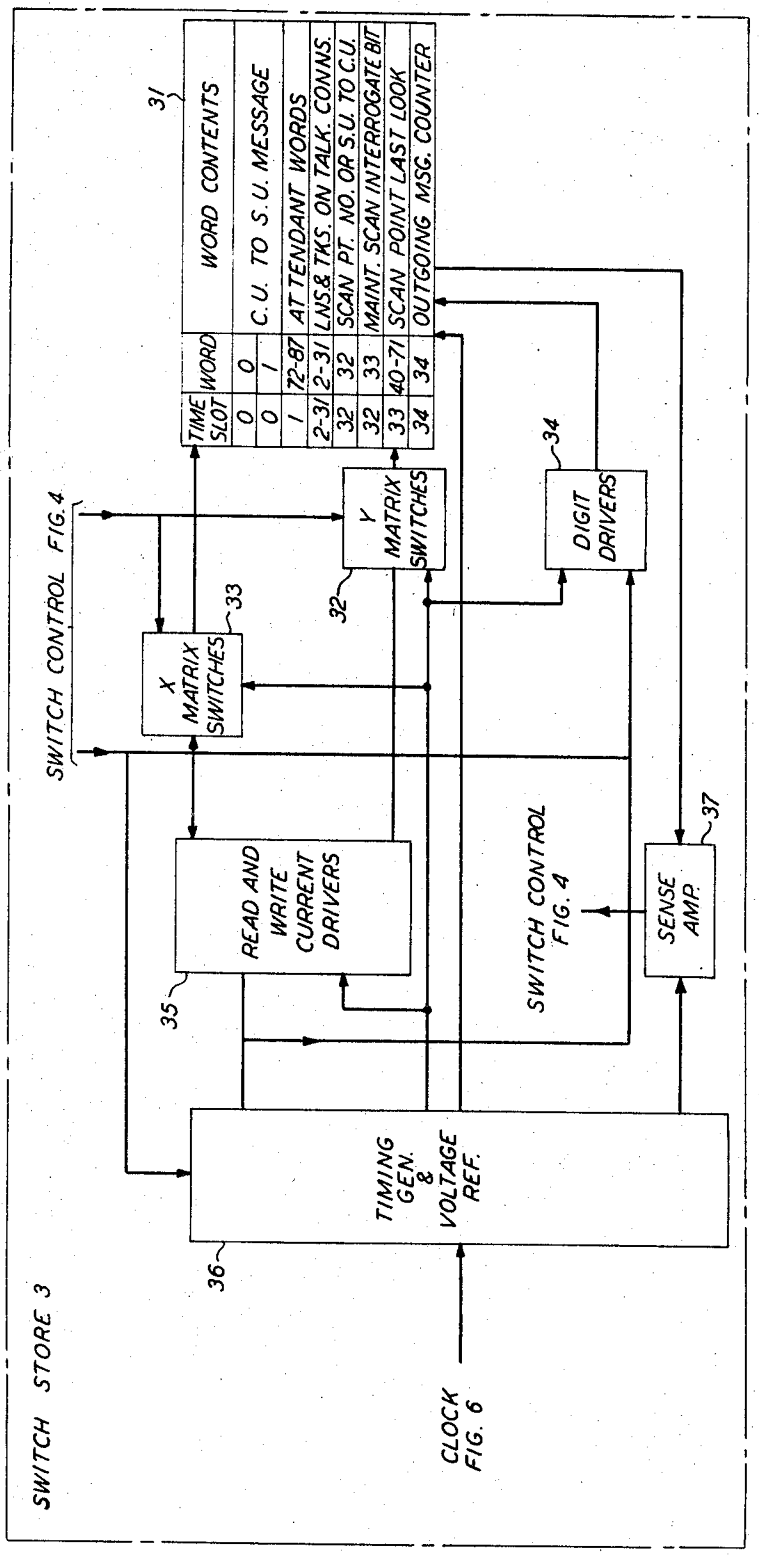
FIGS. 3 through 13 depict in greater detail each of the components illustrated in block form in FIG. 2.

(4) Switch store (FIG. 3)

The switch store 3 in this illustrative embodiment provides space as indicated in memory 31, FIG. 3, for the storage of eighty-three words of twenty-four bits or binary digits each including (1) messages transmitted between the control unit and the switch unit, (2) the identity of each pair of lines involved in a talking connection, (3) the status of all lines observed during the previous scan, referred to as the scanner last-look information, and (4) attendant lamp lighting information. During each 35 time slot cycle through the store, which requires 86.1 microseconds to complete, all talking connection words (2 through 31) are retrieved from the memory 31 in sequence and utilized to complete the interconnection of active pairs of lines in the corresponding assigned time slots. In addition, one of the scan point last-look words 40–71 and one of the attendant lamp words 72–87 are read out in each cycle. This mode of operation permits the entire talking connection word area to be observed many times during a complete cycle through the scanner last-look and attendant words.

The thirty-five switch store time periods, each of 2.46 microseconds duration, correspond to the time slot switching interval in which active pairs of lines are interconnected to exchange voice samples. The arrangement of words assigned to these time periods will be considered in detail in conjunction with the description of the switch control 4. Suffice it to say at this point that during time periods 2 through 31 the talking connection words are retrieved from and rewritten in the memory 31, so that they are referred to hereinafter as the talking time slots. Similarly, time periods 32 and 33 are reserved for the scanning function and time slot 1 for readout of the attendant lamp words.

The memory 31 utilizes ferrite cores arranged in a two-wire linear select array. Accessing the memory 31 are horizontal row switches X and vertical column switches Y. The product of X and Y is the number of words the matrix can select. The Y matrix switches 32 comprise eight bilateral switches which are selected by switch control 4 for Y access to the desired talking connection, scanner last-look and attendant lamp words contained in memory 31, depending on the particular time slot in which the selection occurs. The Y matrix switches select one of the eight vertical columns in the diode matrix of memory 31. Similarly, the X matrix switches 33 select one of the eleven horizontal rows in the diode matrix of memory 31. Matrix 33 comprises eleven bilateral switches which are assigned in groups to provide X access to a particular set of words contained in memory 31; viz., five switches for the talking connection words, four switches for the scanner last-look words, and two switches for the attendant lamp words.

The matrix switches 32 and 33 are activated via store address translator 45 in switch control 4 in conjunction with bipolar current pulses furnished by the read and write current drivers 35. The drivers 35 in turn are operated by timing signals received from timing generator and voltage reference 36. The latter circuit generates read, write and strobe timing signals for the switch store from various phases of the signals received from clock 6 by setting and resetting various timing flip-flops.

The digit drivers 34, as the name implies, provide the necessary binary digit or bit drive for writing in the memory 31. When turned on, each of the twenty-four digit drivers (corresponding to the twenty-four bits in each word stored in the memory) generates a current pulse of the proper duration and amplitude for half selecting all cores on its associated bit line. The digit drivers 34 are driven by gates associated with the store output register 40 in switch control 4.

In addition to timing signals, circuit 36 develops an adjustable voltage reference utilized by the sense amplifier 37 as a threshold voltage. The sense amplifier detects the output signals from memory 31, each bit of an output word being received in a corresponding two-stage amplifier followed by a threshold detector and pulse shaper, the latter circuit delivering a desired output pulse to a corresponding register location in output register 40 of switch control 4.

Figure 4:
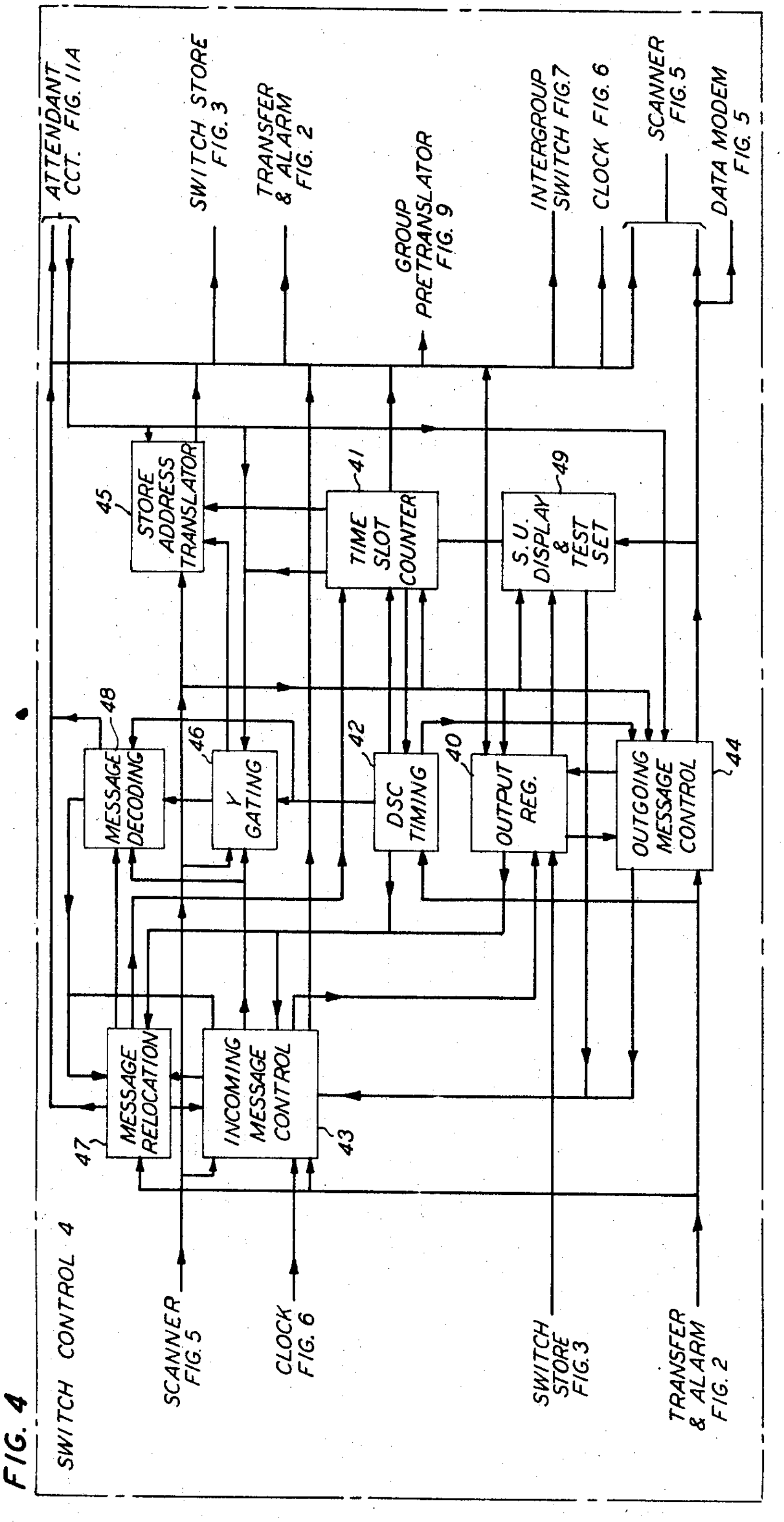

(5) Switch control (FIG. 4)

The switch control 4 provides the basic timing and control for switch store 3 to permit the processing of messages in transit between the switch unit and control unit as well as the cyclical operation of the time division switching network to establish talking connections between active pairs of lines. It comprises well-known logic circuitry throughout including AND and OR gates, flip-flop registers and binary counters. The components are grouped in functional blocks in FIG. 4 for ease of description.

When a word is retrieved from store 3 it must be held temporarily while action is being taken by the rest of the system, based on its content. Output register 40 performs this function. It consists of twenty-four flip-flops corresponding to the twenty-four bits in each word in memory 31. The flip-flops are set by signals from sense amplifier 37 in store 3, as well as by signals from scanner 5 and message control circuits 43 and 44. A typical read-write cycle involves retrieving a word from store 3 and placing it in output register 40 at clock phase 2, writing that word back into store 3 during clock phases 4 and 5, then clearing output register 40 at clock phase 1. Thus the information is contained in output register 40 for at least six of the eight clock phases in each time slot.

Information contained in output register 40 may be written in store 3 in several different modes, which modes are used to advantage in performing the various information transfer operations in the system. In the write-normal mode, the information is rewritten in the bit storage area of memory 31 from which it was previously retrieved. In the write-shift mode, information is written into the bit position adjacent the one from which it was previously retrieved. Repetitive operation in this mode during a specified recurring time slot results in the information in the corresponding word in memory 31 being shifted from the low numbered bits to the high numbered bits. The third mode of operation (termed the write-circulate mode) corresponds to the write-shift mode except that the output of bit 16 is rewritten in bit position 1. Thus in this mode, the contents of certain words in memory 31 are circulated around the first sixteen bits. This mode is employed in the scanning operation only.

Signals from output register 40 to group pretranslator 9 are utilized to establish talking connections and to interrogate line and trunk scan points. The outputs to attendant circuit 11 serve to determine the state of the lamps on the various attendant consoles and, finally, the output signals to scanner 5 are used in the functions of scan point interrogation and last-look readout. Signals from output register 40 to transfer and alarm circuit 14 are switched through that circuit to various other components in the switch unit and, finally, signals to intergroup switch 7 serve to establish the actual time division talking connections.

In order to establish talking connections, the thirty words in memory 31 allocated to talking connections are retrieved sequentially, and each word is stored in output register 40 during a corresponding talking time slot. There are also five time periods numbered 32, 33, 34, 0 and 1, FIG. 3, which are known as data time slots in which the functions of scanning, message outpulsing and incoming message loading are performed.

The entire time cycle of thirty-five time slots 0 through 34 is performed repetitively. Thus in each such switch cycle all of the active line designations plus one scan word and one attendant lamp designation are retrieved from memory 31, placed in output register 40 in corresponding time slots, acted upon and restored to their allocated positions in the memory.

Reference to the time assignments, as shown in memory 31 in conjunction with the following timing description, will assist in understanding the switch control operation. The switch control timing is established by clock pulses received in eight distinct phases establishing a time slot interval from clock 6. Time slot counter 41, which is a six-stage binary counter, is driven by clock phase 6 pulses to produce output signals defining time slots 2 through 31. Beyond time slot 31 the system timing is determined by both time slot counter 41 and logic in switch control timing circuit 42. Thus when time slot counter 41 reaches a count of thirty-two, a signal from the time slot counter, in conjunction with a clock phase 7 pulse, activates timing circuit 42 such that subsequent operation of switch control 4 is directed by flip-flops in timing circuit 42 which are in each of time slots 32, 33, 34, 0 and 1 in conjunction with signals received from scanner 5 and attendant circuit 11.

The outputs of time slot counter 41 are utilized in switch control 4 to provide sequential addressing signals for switch store 3 through store address translator 45 and Y gating circuit 46. Store address translator 45 produces the two sets of output signals which are utilized by matrix switches 32 and 33 in switch store 3 to provide the eighty-eight word addresses required in memory 31.

The operation of these components, as well as those not yet described, may best be understood by following the progress of messages received from and transmitted to control unit 20. Communication between control unit 20 and switch unit 10 is accomplished using a voice frequency signalling system. Messages from control unit 20 are received in switch unit 10, FIG. 2, as analog signals by data modem 50 converted into binary form, and passed to switch control 4 through a relay contact network in transfer and alarm circuit 14.

Figures 14A, 14B, 14C, 14D:
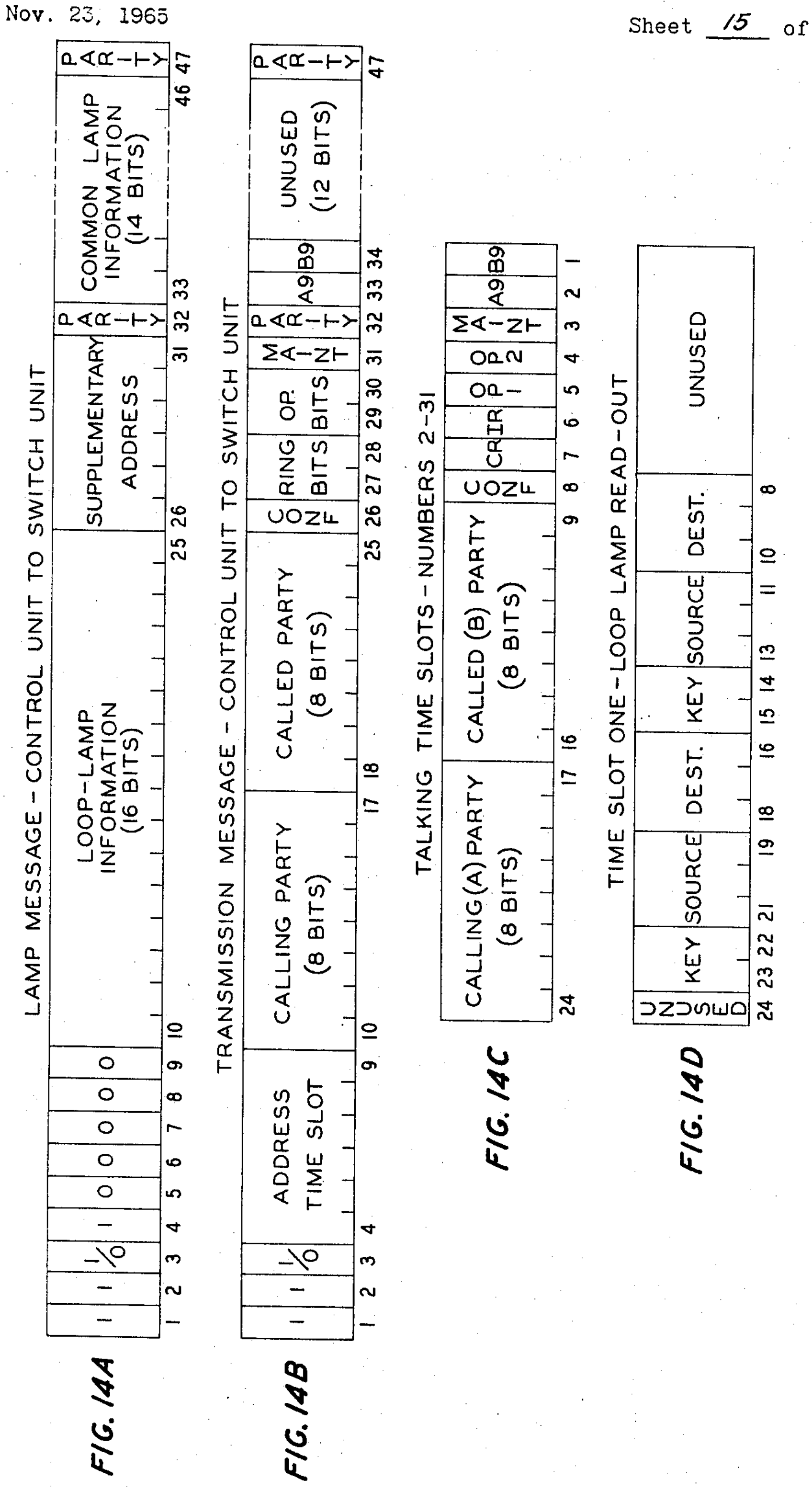
FIGS. 14A through 14D depict various message formats utilized in establishing call connections through the system.

Each message received from the control unit consists of a sequence of forty-seven binary digits or bits. The message format is illustrated in FIGS. 14A and 14B. As noted therein, the beginning of a message is identified by a pair of ones appearing in sequence. Switch control 4 recognizes this message start code which identifies the following forty-five bits as a complete message. Upon disposal of the current message, switch control 4 looks for another pair of ones before recognizing received signals as constituting a new message.

The messages fall into two classifications, as determined by bits 4 through 9, termed the address portion of the message. In this illustrative embodiment if bit 4 is a one and the remaining address bits are zeros, FIG. 14A, the message is identified as containing information pertaining to the state of lamps on the attendant console. This is called a lamp message, and in this instance, information pertaining to the disposition of the message is contained in a supplementary address (bits 26 through 31). In addition to the start and address bits, the lamp message itself is contained in bits 10 through 25 and 33 through 46. Bits 32 and 47 are utilized for parity checking and bit 3 (termed the go-ahead bit) informs the switch unit whether or not it may now transmit a message to the control unit.

Various other possible sequences of ones and zeros in bits 4 through 9, defining the message address, form the transmission message format, as illustrated in FIG. 14B. The transmission message contains information for the establishment of talking connections. The time slot in which the talking connection is to be established is contained in bits 4 and 6 through 9, bit 5 denoting the on-line system or active components which will process this message. All messages are processed in both on-line and off-line systems, the off-line system which comprises redundant components merely discarding the message after processing. If bits 4 and 5 are both ones and bits 6 through 9 are zeros, a special type of transmission message which is not used for establishing talking connection is identified. Such a message permits the transfer and alarm circuit 14 to initiate certain maintenance actions. However, it is processed in the same fashion as other transmission messages, with the exception of its final disposition.

The transmission message itself comprises the identity of the calling party in bits 10 through 17, and the identity of the called party in bits 18 through 25. The go-ahead bit 3 and parity bits 32 and 47 correspond to the lamp message. Information pertaining to various other services such as conference calls, ringing and maintenance is found in bits 26 through 31, 33 and 34.

The parity bits included in each message are to insure that random noise disturbances in the data link do not cause misinterpretation of a message. When a message is formulated at the control unit, the number of ones included in the first thirty-two bits is made odd, while the ones included in the last fifteen bits are made even, so that the total number of ones included in the message is odd. If the message as received at the switch unit does not have these properties, it is discarded and a maintenance routine is activated.

As each bit of the forty-eight bit message is received in incoming message control 43, a sequence of operations is initiated which results in the message being loaded serially into two twenty-four bit word storage areas in switch store 3 during time slot zero. First a "bit waiting" flip-flop in incoming message control 43 is set, indicating that an incoming message bit has been received. During the next appearance of time slot zero, this bit is gated into the least significant digit position of output register 40. Thereafter the write-shift mode of operation, indicated hereinbefore, is initiated, resulting in the message bit being written into the second bit position of word zero in store 3. Word zero is transferred from memory 31 to output register 40 during time slot zero of each store cycle. Thus as each successive message bit is received, the foregoing operation is repeated, resulting in all bits of the message being shifted progressively into more significant digit positions in word zero.

Incoming message control 43 also comprises a binary counter employed in generating the parity for each received message. Between messages, this counter is in the reset state. Each time a one is received, the counter is set, but until a consecutive pair of ones is received, signifying the start of a new message, it is reset. In this fashion the system distinguishes between message data and random noise signals on the data link. When two consecutive ones are received and registered, the parity counter is permitted to count the number of ones in the message, which number must be odd for a legitimate message.

When the next seven message bits have been received by incoming message control 43 and shifted through output register 40 into store 3, the start pair of ones appears in bit positions 9 and 10 of word zero in memory 31, FIG. 3. When word zero is next retrieved from memory 31 and placed in output register 40 during time slot zero, the start bits will initiate several actions. Bit 8, which is actually the "go-ahead" bit 3 of the message, is gated to outgoing message control 44 to indicate that an outgoing message may be prepared. Concurrently, bits 2 through 7, constituting the address portion of the message, are gated to a message address register in message relocation circuit 47. Also a flip-flop in incoming message control 43 is set so that the twenty-two message bits 10–31 received thereafter will be loaded into word one in memory 31 rather than in word zero.

During the next occurrence of time slot zero, incoming message control 43 sets a one into the bit 2 position of output register 40 to act as a bit counter for the next twenty-two bits. Thus at this point word zero in memory 31 contains the start code and the message address, while word one contains all zeros except for bit position 2. After the next twenty-two bits have been received and shifted, the one which was set in bit position 2 of word one in memory 31 will appear in bit position 24. When the next message bit (which is the first parity bit) is received, it is retained in incoming message control 43 by action of logic circuitry responsive to the appearance of a one in bit position 24 of word one contained in output register 40 during time slot zero. If up to this time an even number of ones has been received in the message, the parity counter in incoming message control 43 will be in the reset state and will set a parity flip-flop, signifying a message parity failure. In this case, upon receipt of the last message bit, the entire message will be discarded. Contrarily, an odd number of ones in the message will result in the parity flip-flop remaining in the reset state, so that the message will be retained.

Whether or not the parity check is successful, fifteen more bits must be received to complete the message. The handling of these bits varies, depending upon the type of message involved. If it is a lamp message, FIG. 14A, the flip-flops in message relocation circuit 47 are reset and the information in output register 40, stages 2 through 7, is inserted therein. These flip-flops now contain the supplementary message address bits 26 through 31. At the next appearance of time slot zero, word zero is retrieved from memory 31 and placed in output register 40. At this point, word zero contains the start code and the message address, while word one contains the loop-lamp information plus the supplementary address and the first parity bit. The next fourteen message bits are now transferred into memory 31 so that they occupy the remaining space in word zero. Upon completion of this transfer, word zero now contains the two ones of the start code, the go-ahead bit, the message address in positions 4 through 9 and the common lamp information in positions 10 through 23, the latter being transferred from the incoming message bit positions 33 through 46.

The second parity bit is now detected and the parity counter in incoming message control 43 acts as previously indicated for the first received parity bit.

With a correct parity check indication, the message contained in words zero and one is relocated in store 3, as described hereinafter. A signal is gated from message relocation circuit 47 to attendant circuit 11 to set the attendant counter contained therein to zero. At the beginning of time slot one, FIG. 3, the two least significant bit positions in the attendant counter are set to the one state, and supplementary address bits 28 and 29, FIG. 14A, are gated from message relocation circuit 47 to the highest order bit positions of the attendant counter. Also during time slot one, the resetting of output register 40 is inhibited, as is the store retrieval circuitry. As a result, the content of word zero which was set in output register 40 during the retrieval time of time slot zero remains in output register 40 during time slot one. This information, consisting of the message address and the common lamp information, is now written into a new word location in memory 31, as determined by the content of the attendant counter. The location in the word 72–75 area of memory 31, FIG. 3, at which it is stored is referred to as the common lamp word for the attendant designated by the two highest order bits in the attendant counter.

On the next occurrence of time slot zero, word one is retrieved from memory 31 and its content placed in output register 40. Again the attendant counter is set to zero, and during time slot one the content of message relocation circuit 47, corresponding to supplementary address bits 28 through 31, is gated to the attendant counter. A word location in memory 31, as determined by the current content of the attendant counter, is now loaded with the content of output register 40; viz, the information retrieved from word one. Thus the information formerly contained in bits 10 through 32 of the received message, FIG. 14A, is now stored in a second word location in memory 31. This information is known as the loop-lamp information and the memory word in area 76–78, FIG. 3, used to store it is known as the loop-lamp word.

At this time the system must be restored to the correct state for reception of a new message. This is accomplished during time slot 34 by a logic circuit in message relocation circuit 47, which resets all flip-flops in incoming message control 43, message relocation circuit 47 and message decoding circuit 48. The store readout circuitry is also inhibited during time slot zero, and the content of word zero is destroyed, leaving all zeros in that position in memory 31. The system is now prepared to receive a new message.

As indicated, every incoming message is processed in the same manner up to the receipt of the first parity bit. For a transmission message, FIG. 14B, bit 33 replaces bit 32 in the first stage of output register 40, so that when it is write-shifted it will appear adjacent bit 31 in word one of the memory. The balance of the message bits are received and stored in normal fashion; i.e., not shifted during storage, and the parity check operation is performed.

During time slot zero following the successful parity check, memory word one is read into output register 40, and the message address is gated from message relocation circuit 47, where it was previously stored, to time slot counter 41. During time slot one, store readout and output register reset are inhibited, and the content of word one, currently contained in output register 40, is written into the talking connection word storage area corresponding to the selected talking time slot 2–31 as determined by the message address in time slot counter 41.

The processing of transfer and alarm messages is essentially the same as that for transmission messages. Since both on-line and off-line systems receive each message simultaneously, when one system is transferring the content of word zero to a talking time slot, the other system must be discarding the message. This is accomplished by transferring the content of word zero to word one, which word is subsequently cleared during the processing of the next message.

When a message fails parity check, word zero is cleared, thereby destroying the first nine and last thirteen or fifteen bits of the message. Word one contains the middle portion of the message, and this is destroyed when word one is cleared in processing the next message received from the control unit. A positive signal to the attendant circuit 11 by way of transfer and alarm circuit 14 is used to force a maintenance scan point to the off-hook state, thereby causing a message to be transmitted to the control unit, indicating receipt of an incorrect message.

Outgoing message control 44 facilitates the transfer of messages pertaining to line conditions from the switch unit to the control unit. It comprises various logic elements such as AND and OR gates, flip-flop registers and counters, as well known in the art. Messages are prepared by scanner 5 upon each change in the condition of a line and inserted in word 32 of memory 31, FIG. 3, reserved for that purpose. Upon receipt of a signal from incoming message control 43 that the control unit is ready to receive a message, it is outpulsed a bit at a time in time slot 32 through outgoing message control 44 to data transmitter 51 in data modem 50 at a rate determined by timing signals from data receiver 52. A four-stage binary counter in outgoing message control 44 is driven by data receiver 52 so as to provide the bit duration timing for the outgoing message.

Word 34 in memory 31 serves to count the bits of an outgoing message as they are transmitted to the control unit. For this purpose logic circuitry in outgoing message control 44 inserts a one in the first bit position of word 34 upon transmission of the first message bit and thereafter shifts the one to a more significant digit position for each message bit transmitted. Outgoing message control 44 also recognizes the appearance in bit position 13 of word 34 as the end of a transmitted message and is responsive to receipt of a signal from output register 41 indicating this condition to reset its control circuitry and reinitiate the scanning operation.

The outgoing message as constructed by scanner 5 consists of a start bit, a nine bit scan address which identifies the line that has changed condition, and a bit identifying the present state of that line. During time slot 32 the message is gated from store 3 to output register 40. The start bit is then transferred to a buffer register 44 where it is first utilized to initiate the message count in word 34 and to shift each bit of the message stored in word 32 by one bit position. Thus in the next cycle of operation the second bit of the message is in position to be gated to outgoing message control 44, and the message count bit contained in word 34 is advanced to bit position 2. The start bit now serves to activate data transmitter 51. A new bit is moved into the buffer register and the count in word 34 is again advanced. These operations are repeated in successive cycles until the message count bit appears in bit position 13 of word 34. Message parity is generated as the message is outpulsed and is sent as the thirteenth message bit. Upon completion of the message transmission the scanner logic is reset and resumes scanning. All registers and timers in outgoing message control 44 are also reset preparatory to the processing of succeeding outgoing messages.

In the interest of reliability in system performance, the major control circuits in switch unit 10 are duplicated. In some cases one member of a duplicate pair is in an operating state, while the other is inactive, such as for example, the two oscillators in clock 6. Most of the circuits which are duplicated are operating continuously. In the event of a failure, one of the duplicated units is disabled, thereby resulting in a reduction of system load capacity. Switch control 4 receives a signal from transfer and alarm 14 describing the state of the system scanners in order to insure that a message is sent to the control unit only from a switch control 4 associated with an on-line scanner 5. This signal provides an input to gates in switch control 4 which carry the outgoing message bits to data modem 50. In the event that a duplicated system is disabled by transfer and alarm 14, power is removed from group pretranslator 9. This prevents any information in store 3 from affecting the operation of group cir- circuits 12 or intergroup switch 7. Nothing is disturbed in switch control 4 while the system is in this state and, therefore, maintenance actions may be taken without affecting any traffic the system is handling in the enabled path of the system. Switch unit display and test set 49 implements test procedures by monitoring signals within the switch unit.

Figure 5:
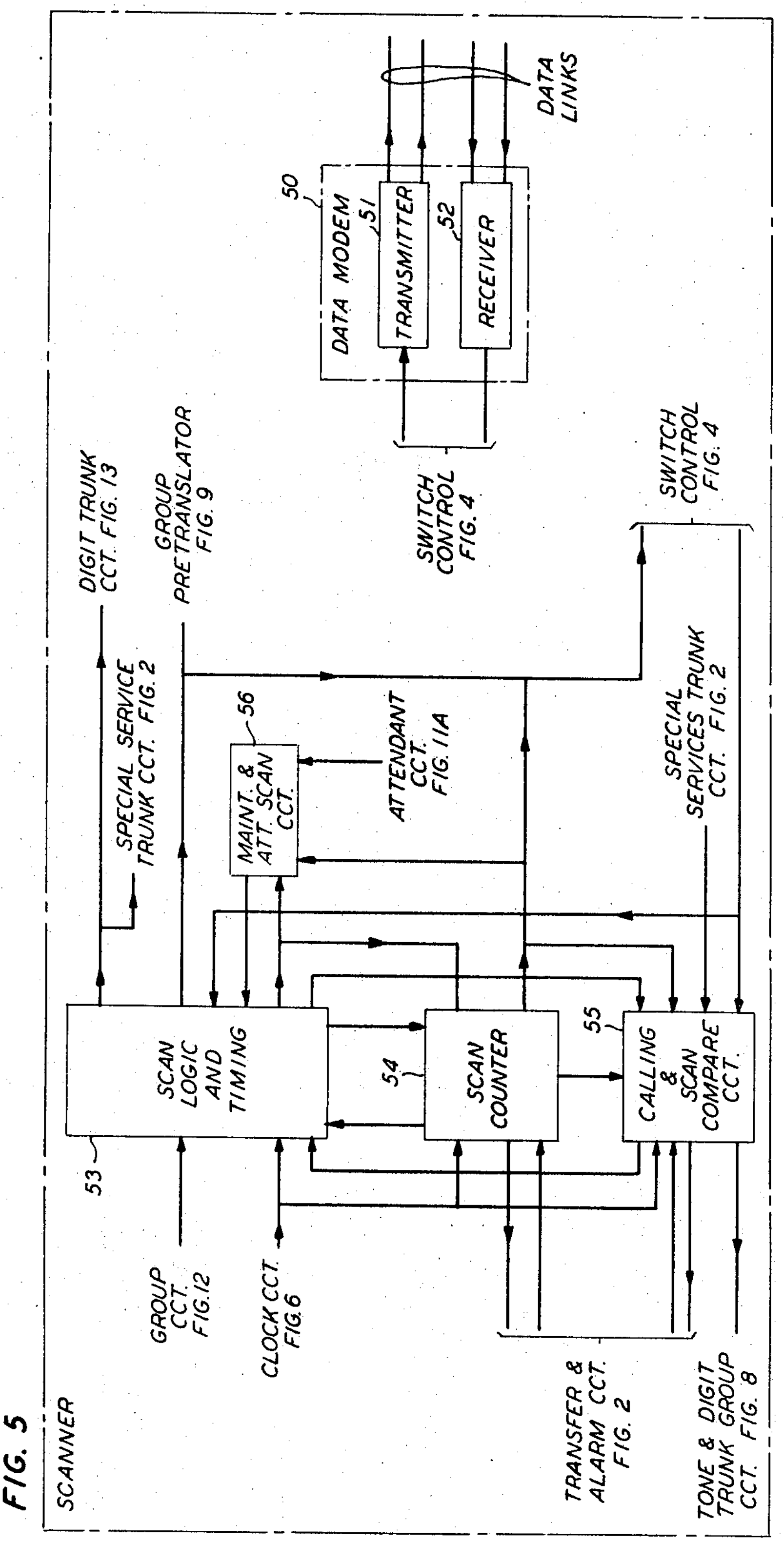

(6) Scanner (FIG. 5)

The scanner, as depicted in FIG. 5, periodically determines the current state of all lines, trunks, maintenance and attendant circuits and compares this state with the state previously encountered for each of the scanned circuits. When this comparison reveals that a change in state has occurred, scanner 5 so informs switch control 4 which, in turn, transmits a message through data modem 50 to control unit 20, containing the binary address and present state of the circuit involved.

For purposes of this description, scanner 5 may be divided into four basic components, all of which comprise logic circuitry well known in the art, such as AND and OR gates, flip-flop registers and counters. Scan logic and timing circuit 53 directs the operation of the scanner and contains the two registers essential to the primary comparison function, viz., the present state register and the last-look register. As their names signify, these registers reflect the desired present and previous condition of the circuit currently being scanned in the switch unit. The present state is obtained directly from the circuit involved, while the last-look state is obtained from memory 31 in switch store 3 via output register 40 in switch control 4. Also of interest in scan logic and timing circuit 53 is a flip-flop, the state of which determines whether the circuit will scan lines and trunks or maintenance and attendant scan points. A slightly different procedure is involved for each type of scan, as will become apparent hereinafter. The state of this flip-flop is determined by the current position in the scan cycle, as indicated by scan counter 54. Another flip-flop in scan logic and timing circuit 53 is set each time a message should be sent to the control unit indicating that a change in state has occurred in a particular circuit under scan. Since two cycles are involved in the scanning operation, a binary counter designated the scan-update counter, is included in scan logic and timing circuit 53 to indicate which of the two cycles is to be initiated during the current scan. Finally scan logic and timing circuit 53 includes a two-stage binary counter, designated the rescan counter, which repeats the scan of a given line or trunk if the results of the comparison of the present state and last-look state indicate that a change of state has occurred. This counter permits four scans of the same line or trunk to assure that the change of state has not been caused by a spurious signal which would otherwise result in the transmission of an erroneous message to control unit 20.

Scan counter 54 comprises a nine-stage binary counter, the state of which defines the particular scan point under consideration. The size of this unit permits 512 distinct scan points in the switch unit to be cyclically interrogated.

When a line is scanned during its connection to a digit trunk for outpulsing, it may appear to the scanner as though the line is on-hook when, in fact, it is an active calling line. Calling and scan compare circuit 55 comprises a plurality of logic gates which make a bit-by-bit comparison of the calling line address appearing in output register 40 with that contained in scan counter 54. An exact comparison will indicate that the line under scan is, in fact, an active calling line and the normal scanning procedure will be inhibited.

Maintenance and attendant scan circuit 56 comprises a plurality of logic gates which provide the final translation stage for the interrogation of maintenance and attendant scan points. These gates receive the interrogation results from attendant circuit 11 and direct them to the present state register in scan logic and timing circuit 53 at the appropriate time.

Scanner 5 functions on a two-cycle basis involving time slots 32 and 33 of memory 31, FIG. 3. During the scan cycle the address of a scan point is gated from scan counter 54 into word 32 of memory 31 via output register 40 in switch control 4. It is also directed in time slot 32 to group pretranslator 9 for subsequent interrogation of the particular scan point involved. The result of this interrogation is received in the present state register in scan logic and timing circuit 53 from the particular group circuit 8, 11 or 12 with which the scan point is associated.

During time slot 33 the last-look area in memory 31 is addressed by scan counter 54 via output register 40, resulting in the retrieval of a word containing sixteen last-look bits. Through a shift and rotate process conducted in successive cycles, the appropriate last-look bit will be found at this time in the first bit position of output register 40. It is subsequently gated to scan logic and timing circuit 53 and stored in the last-look register.

During succeeding time slots until the next appearance of time slot 32, the content of the present state register is compared with that of the last-look register. In the next appearance of time slot 32, a message comprising the scan point address, the present state bit and a message start bit is gated into word 32 in memory 31. Again in time slot 33, the last-look word is retrieved from memory 31, but in this instance the pertinent last-look bit is replaced by the present state bit currently contained in output register 40.

If no change in state has occurred, scan counter 54 is advanced and, on the next store cycle, the scan procedure is repeated for the next scan point address. A write-circulate command received while the last-look word is contained in output register 40 will result in the last-look word being shifted one position and stored in memory 31 such that upon its subsequent retrieval the previous highest order bit will appear as the lowest order bit, a condition which will cause the pertinent last-look bit to match the scan point currently registered in scan counter 54.

If during a comparison of the content of present state and last-look registers it is revealed that a change in state has occurred, the message request flip-flop in scan logic and timing circuit 53 is set, serving to inhibit further scanning and to inform switch control 4 that the message currently stored in word 32 of memory 31 may be sent to control unit 20. Scanner 5 resumes scanning upon receipt of a signal from switch control 4 that message transmission has been completed, which signal resets the flip-flops and counters in scan logic and timing circuit 53 and advances scan counter 54 preparatory to interrogation of the next scan point in the sequence.

The maintenance and attendant scan points are interrogated in sequence following interrogation of each of the line and trunk scan points in the scanning cycle. They are accessed by a separate translator which comprises a counting chain formed in word 33 of memory 31, FIG. 3, together with a translation of certain bits in scan counter 54. These scan points are not associated with circuits accessed during time division connections, as is the case with line and trunk scan points. Thus a distinct method of translating a given scan counter state into an interrogation signal which is applied to the appropriate maintenance or attendant scan point is utilized. Furthermore, some of these scan points require that a message be sent to control unit 20 only in those instances when the present state condition changes from on-hook to off-hook, i.e., inactive to active.

Maintenance and attendant scan circuit 56 is employed, therefore, to recognize the beginning and end of the maintenance and attendant scan point portion of the scanning cycle, to identify those scan points in this portion which require only off-hook messages, and to provide the necessary translations for interrogating each of the maintenance and attendant scan points. Thus for maintenance and attendant scanning, a command is give to memory 31 which results in the readout of word 33 in time slot 32 rather than word 32 which is normally accessed in this time slot. Word 33 forms a ring counter which is cleared at the outset of the maintenance and attendant portion of the scanning cycle and a one inserted in the first bit position thereof. The maintenance and attendant scan points are connected sixteen in a group, with a total of five groups. Thus word 33 is arranged to form a sixteen-bit ring counter and the count bit position determines which of the sixteen scan points in each group is to be interrogated. For example, if the count bit is in the first bit position of word 33, the first scan point in all five groups is interrogated. A one-out-of-five translator contained in maintenance and attendant scan circuit 56 then determines which of the five groups will be permitted to transmit a signal to the present state register in scan logic and timing circuit 53.

The last-look bit is selected from the last-look section of memory 31 in the same fashion for all scan points, and the updating procedure conducted during time slot 33 is also the same for maintenance and attendant scan points as for line and trunk scan points. However, for each comparison of present state and last-look bits, a message is sent to control unit 20 for those maintenance and attendant scan points which reflect the on-hook to off-hook condition only if the present state is off-hook.

The scanning operation utilizes the time division switch drive circuitry to interrogate line and trunk scan points. Normally, with this arrangement, an additional time division switch closure at the scan rate would be experienced by each line and trunk circuit which, of course, would introduce an annoying audible tone if the line were off-hook at the time. In accordance with this invention, a series switch is added for each group of thirty-two time division switches to supply the power required to drive the switches. During time slot 32 when scanner 5 is interrogating a particular scan point, a signal is transmitted from clock 6 which opens the series switch and prevents operation of the time division switches during this interval. This operation is designated the quiet scan function and is discussed more fully hereinafter in conjunction with the line circuit with the line circuit description.

Also in the arrangement of the switch unit in accordance with this invention, dial pulse information is directed to the digit trunk circuits via the same path followed by scanning signals directed from each line and trunk circuit to scanner 5. In order to prevent scanner 5 from interpreting the digit pulses present on the scanning bus from calling lines during the process of outpulsing as disconnects, normal scanning of the outpulsing line must be inhibited. This is accomplished by comparing the contents of scan counter 54, the next line to be interrogated, with the address of the calling party in each time slot of the office cycle prior to time slot 32. If such a comparison provides a match, a signal is transmitted from calling and scan compare circuit 55 to the scan disable flip-flop in scan logic and timing circuit 53. This flip-flop condition will inhibit normal scan operation of the active line upon arrival of time slot 32.

Figure 9:
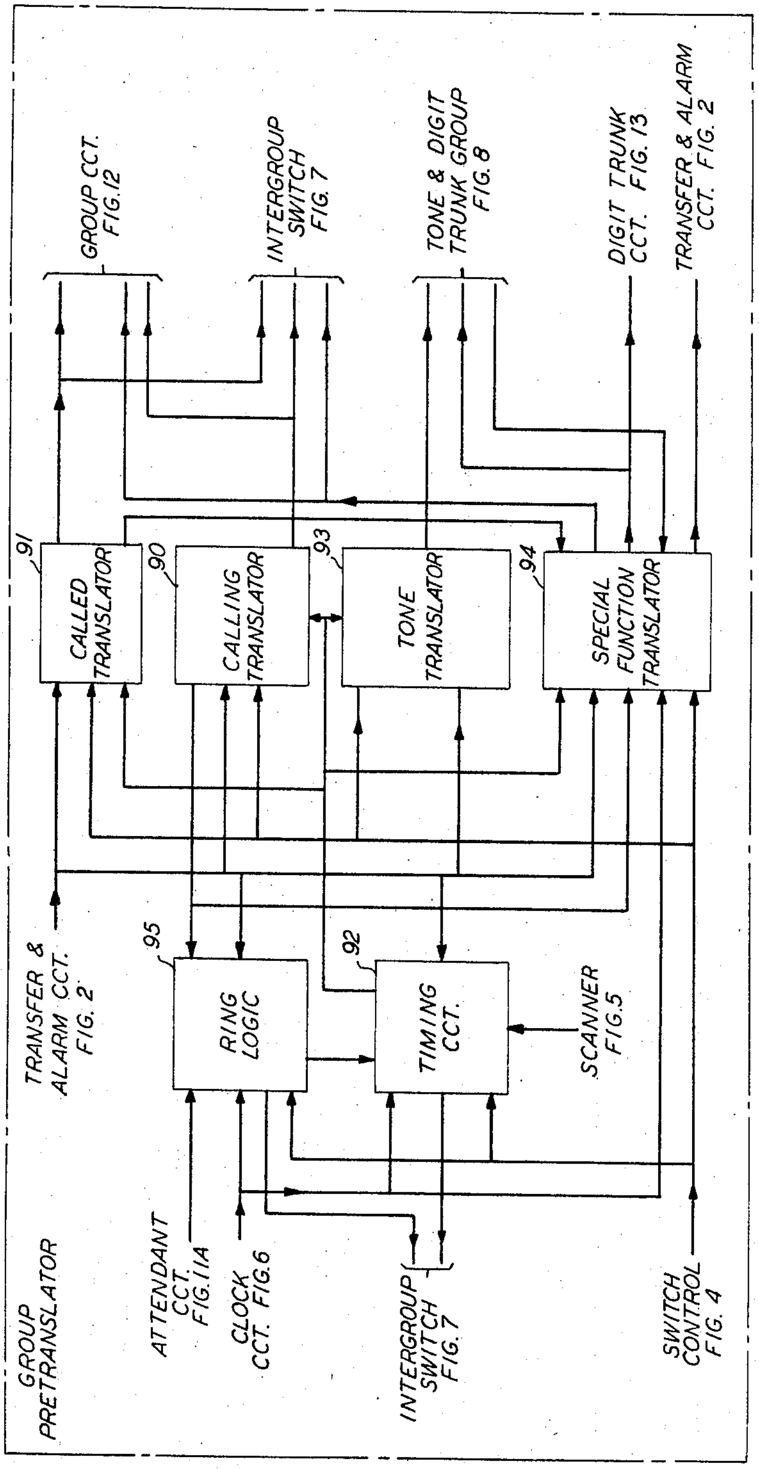

(7) Group pretranslator (FIG. 9)

Group pretranslator 9 receives the addresses of calling and called parties from output register 40 in switch control 4 during each talking time slot and serves to translate these addresses into signals which are directed to the various group circuits to cause the appropriate lines, trunks or tone circuits to be connected together during each appearance of the particular talking time slot. Scan point addresses are selected via group pretranslator 9 during the scan time slot.

Calling translator 90 comprises groups of AND gates arranged to perform specific translations of various groups of binary digits forming the calling party's address. The message, as stored in output register 40 in a talking time slot 2–31 is as shown in FIG. 14C.

The bits in positions 2 and 17 through 24 are transmitted to calling translator 90. Bits 2, 23 and 24 are employed in determining the particular group in which the calling line is located and for this purpose are translated into a one-out-of-eight signal directed to the particular group circuit 12 in which the calling line is located and to intergroup switch 17 for interconnection of the group buses terminating the calling and called lines. Similarly, bits 20 through 22 are translated into a vertical selection signal and bits 17 through 19 into a horizontal selection signal. These signals are then directed to all group circuits 12 where they serve to select a particular crosspoint which, coupled with the group indication, locates the particular crosspoint associated with the calling line.

Called translator 91 comprises three translation circuits which perform translations on the called party's address similar to those performed by calling translator 90 on the calling party's address. Thus bits 1, 15 and 16, FIG. 14C, are directed to called translator 91 for group select translation, while bits 12 through 14 and bits 9 through 11 are utilized for the vertical and horizontal selection, respectively.

Timing circuit 92 comprises a series of logic gates and a monopulser from which the precise time interval is obtained during which the translated selection signals are directed to the appropriate group and intergroup circuits.

Figure 8:
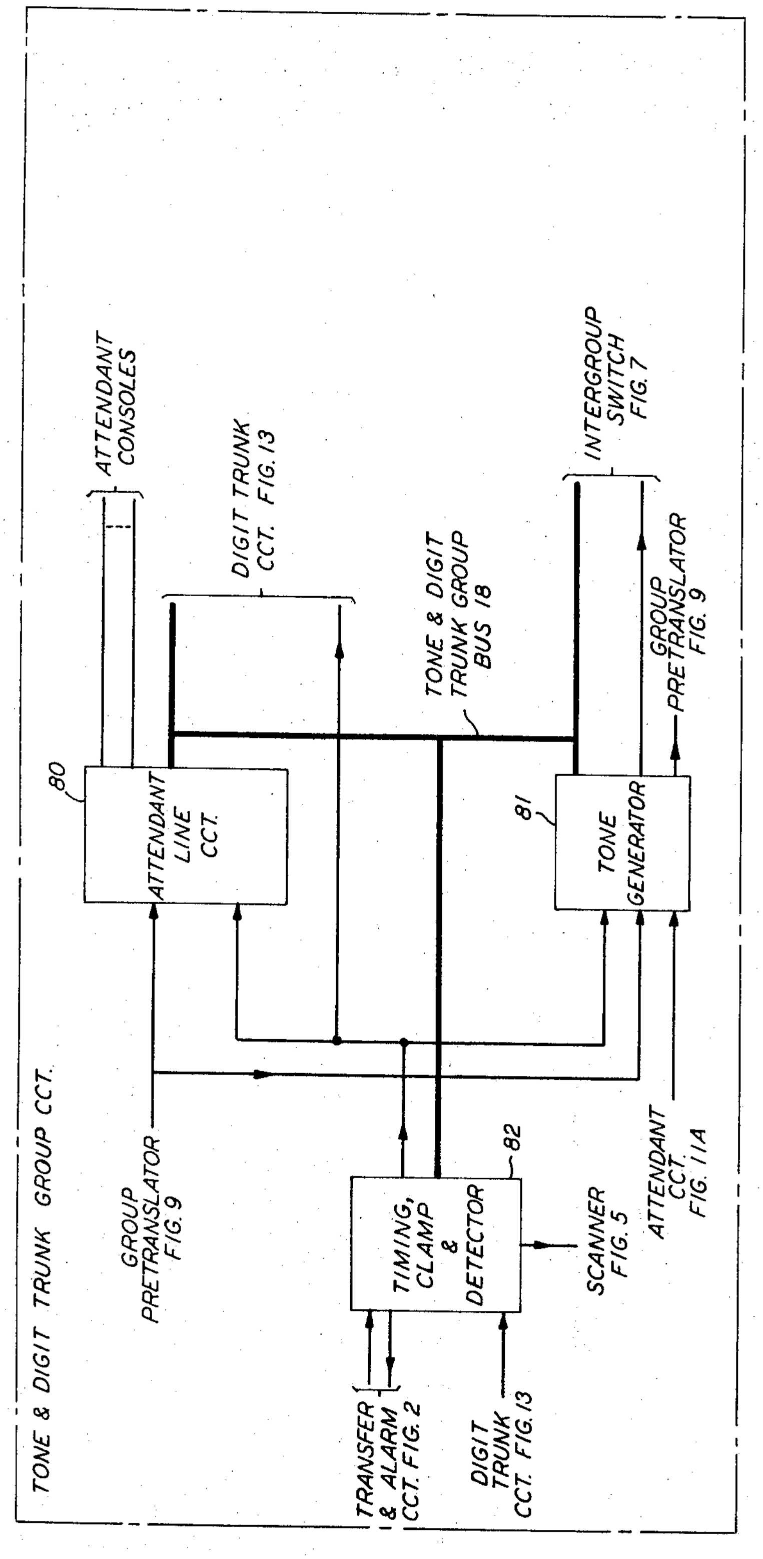

Any of the required tones generated by oscillators contained in tone generator 81, FIG. 8, may be connected to a talking bus in place of either party. These tones are selected via logic gates in tone translator 93, which gates perform appropriate translations to select the tone and simultaneously block the connection of the calling or called party in the talking time slot. Thus in a particular occurrence of the talking time slot, bits 17 through 24, identifying the calling party, and bits 9 through 16, identifying the called party, are also directed to tone translator 93. The respective translations result in a pair of signals being transmitted to special group circuit 8 for appropriate action to direct the selected tones to special group bus 18.

Special function translator 94 comprises a plurality of logic gates and flip-flops utilized to select a digit trunk or attendant circuit and to establish a conference connection. The digit trunk number appears only as a called party in the talking time slot message, FIG. 14C, in output register 40. Thus bits 1 and 9 through 16 are directed to the digit trunk translator portion of special function translator 94 where they are translated into a one-out-of-seven code and the resultant signal gated to the appropriate digit trunk circuit 13 through special group circuit 8. Similarly, bits 4 and 5, designated the attendant bits in the talking time slot message, are directed to the attendant translator portion of special function translator 94. For all combinations of bits 4 and 5 other than both zeros, an outgoing signal from the attendant translator will be directed to special group circuit 8 in order to connect the appropriate attendant line circuit 80 to special group bus 18.

The conference bit in the talking time slot message, FIG. 14C, is bit 8, and when a one appears in this bit position in output register 40 in any one of the first twelve talking time slots, it is transmitted to the conference translator portion of special function translator 94. This translator, in turn, translates the four least significant bits currently contained in time slot counter 41 of switch control 4 into a three-bit code which is then gated into intergroup switch 7 to provide a time division connection from intergroup bus 74 to a conference capacitor 73 in addition to the calling and called party connections.

Ring and ringback signals are applied to the talking bus by intergroup switch 7 when an appropriate combination of the ring bits 6 and 7 are included in the talking time slot message, FIG. 14C, contained in output register 40. Ring logic 95 generates signals to activate the ring and ringback switches in intergroup switch 7 for the desired intervals. For example, when continuous ring bit 7 is a one and interrupt ring bit 6 is a zero, ring logic 95 transmits signals to intergroup switch 7 which result in ringing signals being applied immediately and continuously to the appropriate talking bus in every time slot containing this code. Under timing control of control unit 20, the ring bits are changed to make the continuous ring bit 7 a zero and the interrupt ring bit 6 a one. At this time ring logic 95 activates intergroup switch 7 to apply ring and ringback control signals to the talking bus for one second and to remove them for the succeeding three seconds.

Ring logic 95 also serves to divide the time slots into four distinct groups to provide four-phase ringing which presents a smoother load to the ring generator. A more complete discussion of this ringing operation is contained in R. A. Louis application Ser. No. 320,378, filed Oct. 13, 1963.

Figure 7:
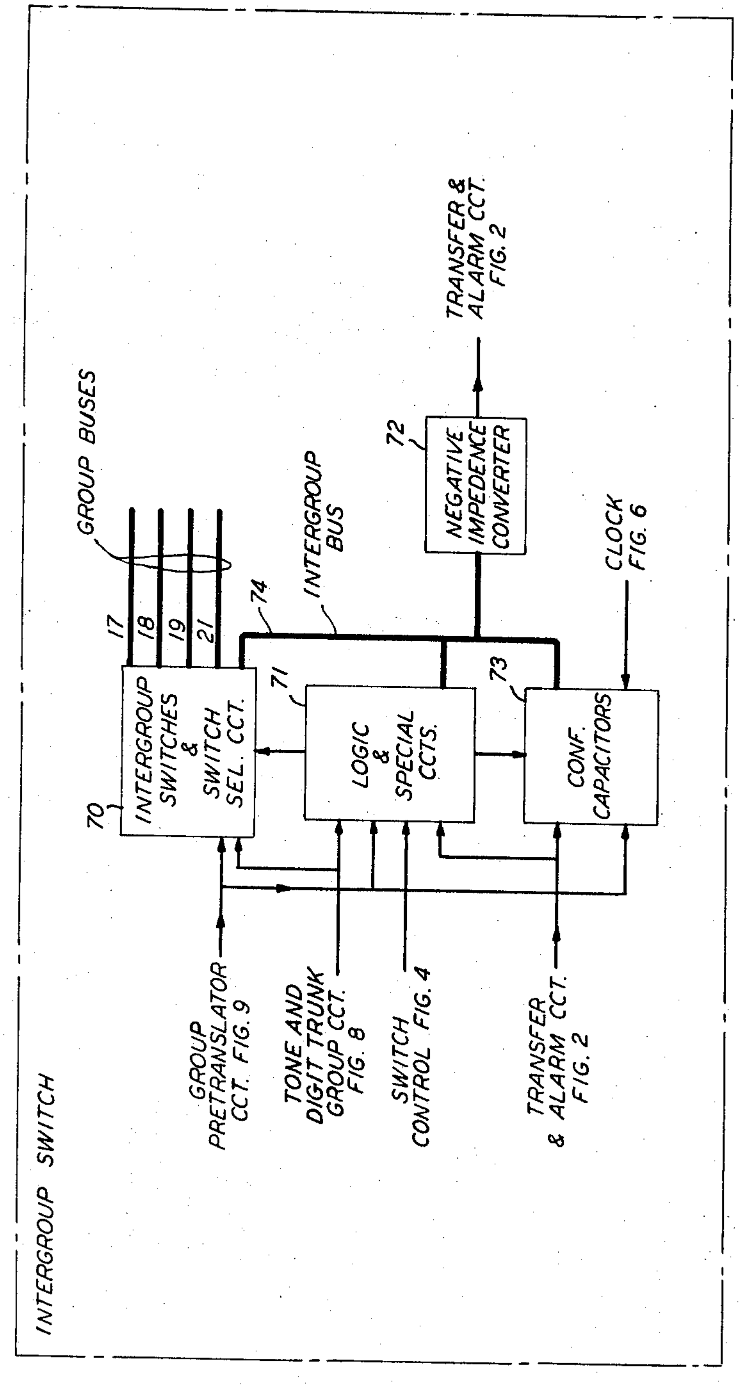

(8) Intergroup switch (FIG. 7)

The intergroup switch 7 provides the necessary time division link, intergroup bus 74, between the group buses 17, 18, 19 and 21 serving the trunks and special service circuits. Time division switches for completing these links in each assigned time slot are contained in intergroup switches and switch selection circuit 70. These switches are operated selectively by one bit of each of the calling and called parties' designations as received from output register 44 in switch control 4 through group pretranslator 9 in conjunction with appropriate clock signals establishing the precise time slot interval for operation of the selected time division switches.

To ensure high return loss through the actual time division switching medium, there is a commonly used video negative impedance converter 72 located between the intergroup bus 74 and ground. This is used to trim the excessive positive shunt bus impedances that tend to lower return loss. This converter is active on all calls.

As a by-product, about 0.20 decibel gain is introduced which reduces the gain requirements placed upon the negative impedance voice band amplifiers associated with the trunk circuitry having this feature. A negative impedance converter suitable for this purpose is disclosed, for example, in W. B. Gaunt, Jr. patent application Ser. No. 302,576, filed Aug. 16, 1963, now Patent No. 3,202,763, issued Aug. 24, 1965.

Logic in group pretranslator 9 controls two time division switches in logic and special circuits 71 which, on alternate store cycles, connect ringback tone to the calling party and ringing tone to the called party. On calls involving trunks, the full sampling rate connection, or a sample in each cycle, is made in order to apply ringback tone to trunks in which a higher level of ringback tone is utilized. Time division switches for connecting the intergroup bus 74 to the appropriate group buses 17, 18, 19 are activated simultaneously with the appropriate ringing or ringback switches so as to apply the tones to the calling and called lines as required. Appropriate circuits for amplifying the necessary tones as received from tone and digit trunk group circuit 8 are included in logic and special circuits 71. Special circuits 71 also include a bus clamp effective to remove voice energy signals from intergroup bus 74 during the guard interval between talking intervals in adjacent time slots. A switch is closed during this interval, serving to connect bus 74 to ground. Such action prevents crosstalk from occurring in adjacent time slots.

Conference capacitors 73 are available for connection to intergroup bus 74 through associated time division switches in order to provide conference connections among three or four parties. Conferees are assigned to one of six available sets of paired conference time slots, one of the six conference capacitors 73 being associated with each time slot pair. Assignment of a conference capacitor to a four-party conference results in closure of a time division switch in each of the pairs of conference time slots. In this fashion voice signals developed in one time slot are stored in the conference capacitor until the other time slot of the conference pair appears, at which time the stored signal is transmitted to the other pair of parties to the conference.

Figure 12:
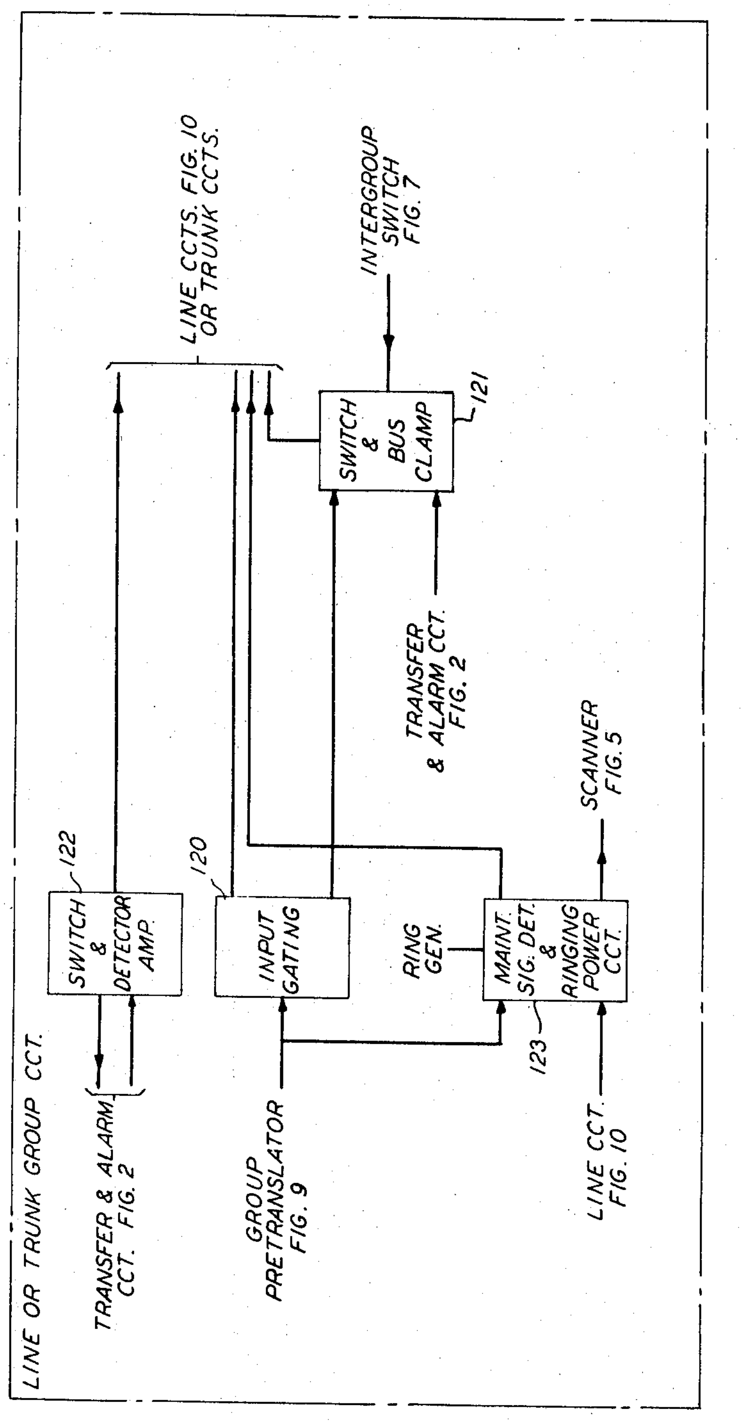

(9) Line and trunk group circuit (FIG. 12)

Each line and trunk group circuit 12 is the control circuit for a corresponding group of sixty-four lines or trunks. Vertical and horizontal address signals from group pretranslator 9 are received in input gating circuit 120, which comprises a plurality of OR gates; the address signals are combined and distributed to the various line and trunk circuits therein.

The OR gate output of input gating circuit 120 is combined with a clock pulse to drive switch and bus clamp circuit 121. This circuit provides power for the final translators located in each line or trunk circuit which, in turn, operate a corresponding time division switch to connect a selected line or trunk to the corresponding group bus 17, 18, 19 or 21. Between each time interval allocated to a time division switch closure, a clamp circuit in switch and bus clamp 121 momentarily shunts each time division bus to ground. This operation clears the time division buses in a guard space between talking intervals so that crosstalk will not occur.

Switch and detector amplifier 122 comprises conventional amplifier circuitry which generates a signal utilized by transfer and alarm circuit 14 to detect if more than one time division switch closes at one time within a particular group. Such a determination is based upon the voltage level detected at the amplifier input. One switch closing produces approximately 1.3 volts while two switches would produce almost twice that amount.

Circuit 123 comprises various individual circuits for detecting maintenance signals, scan bus gates to provide scanner 5 with pulses of a precise amplitude and duration irrespective of the signal received from a signaling line or trunk circuit, a circuit for controlling the distribution of ringing voltage to the various line packages, and a gate circuit which controls a gain switch in tie trunk circuits, the latter circuit compensating for the additional loss encountered on calls involving a tie trunk. Group pretranslator 9 determines from the control unit message if the gain switch is to be activated or disabled and transmits a signal to this particular gate circuit if this operation is to be effected.

(10) Tone and digit trunk group circuit (FIG. 8)

The tone and digit trunk group circuit provides access to digit trunks and attendant consoles and generates and connects tones to the lines and trunks of the switch unit. These various circuits are connected to the tone and digit trunk group bus 18 which, in turn, is connected to the line and trunk group buses 17, 19, 21 through intergroup switch 7.

The attendant line circuits 80 permit the selection of a particular attendant console upon receipt of a control signal from group pretranslator 19 in a predetermined time slot, which signal is directed through various logic gates and actuates a time division line switch corresponding to the desired attendant console. The line circuit includes the usual low-pass filter and transformer for providing the proper impedance match between the time division switch and the attendant line. Group pretranslator 9 also supplies a signal to intergroup switch 7 which permits group bus 18 to be connected to the appropriate line and trunk group bus whenever an attendant console is selected.

The various tones necessary for system operation are generated in tone generator 81 of group circuit 8. These tones include an audible ringback tone, which is sent to the intergroup switch 7, a soft tone, a fast busy tone and a normal busy tone. These tones are generated by oscillators of types well known in the art and are combined as required to form the desired tones. These tones are connected to group bus 18 through time division switches upon command from group pretranslator 9.

The period of time division switch closure must be accurately controlled in order to achieve proper resonant transfer of energy from the various tone and digit trunk group circuits to group bus 18. For this purpose timing, clamp and detector circuit 82 is provided. It contains a high speed switch that receives an accurately timed closure signal from clock 6 through transfer and alarm circuit 14. In case of certain system failures, transfer and alarm circuit 14 will instantly switch to the duplicate clock 6 in order to maintain accurate time division switch operation. The closure signal is applied to the various time division switches in the digit trunks, attendant line circuits and tone generator. A bus clamp is provided in circuit 82 to suppress crosstalk by removing energy stored in group bus 18 between talking intervals. A detector in circuit 82 monitors the power supplied to time division switches in the various tone and digit trunk group circuits. It supplies a signal to transfer and alarm circuit 14 proportional to the number of time division switches which close in response to the application of power via particular leads. This permits a maintenance program to test the system for double connections to group bus 18.

Figure 10:
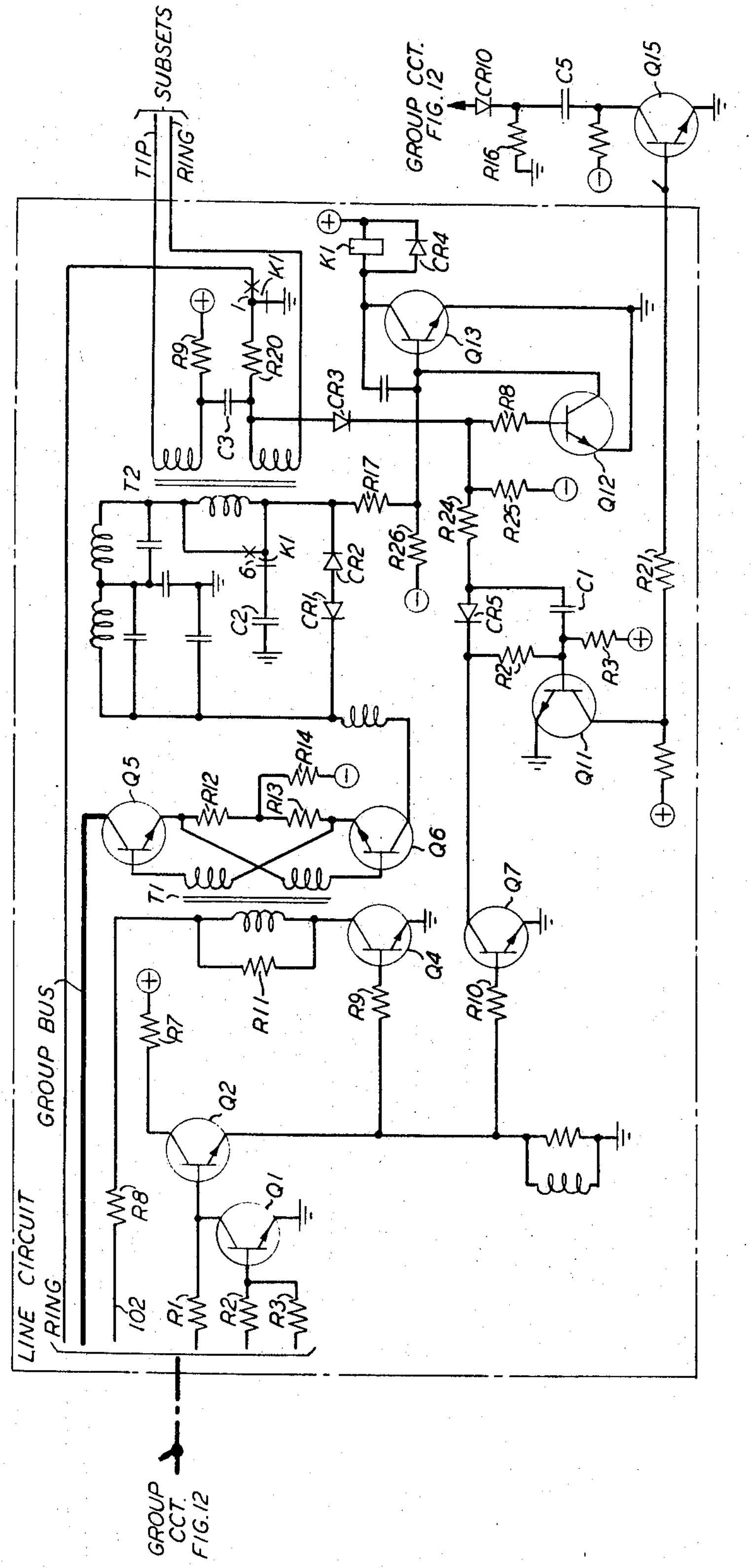

(11) Line circuit (FIG. 10)

Line circuit 10 is arranged so as to provide a balanced audio connection from a telephone subset to an unbalanced time division bus. Partially translated line number information from the associated group circuit 12 is connected through a matrix to the line circuit. A two-input gate at a matrix intersection is selected when both inputs are at ground.

Transistor Q1 performs the final stage of line number translation in the matrix. Normally clock pulses are received through resistor R1 at the base of transistor Q2 and the collector of transistor Q1 during each time slot. These clock pulses are used to control the operation of the time division switch in the line circuit comprising transistors Q5 and Q6. Transistor Q2 is activated under control of the clock pulses whenever transistors Q1 or Q2 are disabled. Thus when a particular line is selected, transistor Q1 will be disabled and transistor Q2 enabled, which in turn transmits a control signal to transistors Q4 and Q7.

If the time slot is a talking time slot, battery will be present on lead 102 so that when transistor Q4 is activated, current will be delivered through the primary winding of transformer T1 via resistor R8. This current flow serves to activate the time division switch and complete a path from the associated group bus designated GB through transistors Q5 and Q6 to the line transformer T2 via a low-pass filter. At the end of the time slot interval the clock pulse is removed from the input to transistor Q2. This causes transistor Q4 to turn off, thereby terminating current flow in the primary winding of transformer T1. The time division switch is thus disabled.

The scanning portion of the line circuit in accordance with this invention utilizes the same input circuitry to generate scan interrogation pulses. Thus each time transistor Q4 turns on, transistor Q7 is also turned on, and the current flow through transistor Q7, diode CR5 and resistors R24 and R25 provides the desired scan interrogation pulse in the line circuit. In order to prevent scan interrogation from interfering with voice transmission during a talking time slot, lead 102 goes to ground during each scan time slot 32 or what is termed the silent scan interval. This, of course, prevents the time division gate from operating and a spurious signal from appearing on a talking connection.

The supervisory state of the line is actually determined by monitoring the voltage on resistor R20 in the subscriber's line loop. Normally, with the line on-hook, interrogate pulses through transistor Q7 fail to turn off transistor Q11. When the line goes off-hook, current flow in the line changes the potential at resistor R20 so as to begin charging capacitor C1. The resulting voltage change upon appearance of the interrogate pulse through transistor Q7 is sufficient to turn off transistor Q11, and it will remain off for the entire time slot interval. With transistor Q11 turned off, a line off-hook pulse will be delivered to the corresponding group circuit through resistor R21. Transistor Q15 in the group circuit is normally turned off so that capacitor C5 is charged positively. Thus when the off-hook pulse arrives, transistor Q15 turns on and a negative pulse is coupled through diode CR10 of the corresponding group circuit 12. Diode CR10 decouples capacitor C5 from the balance of the group circuit 12 when the scan bus goes negative due to other line interrogation. Following the interrogate pulse, transistor Q7 will turn off, and transistor Q1 will turn on.

Complementary actions occur in the change of the line from the off-hook condition to the on-hook condition. When the line goes on-hook, capacitor C1 begins to discharge through resistor R24. Thus during the next interrogation interval, diode CD5 remains back-biased, and no pulses are delivered to transistor Q15.

Ringing is supplied by relay K1 which is controlled by transistor Q13. Normally transistor Q13 is held off by resistor R26. When a line is to be rung, the control voltage arrives via the time division switch and charges capacitor C2. This charge through resistor R17 serves to turn on transistor Q13. This causes relay K1 to operate and apply ringing current through resistor R20 and transfer contacts K1A. Also transfer contacts K1B operate to prevent ringing current from being coupled into the group bus while removing capacitor C2 from the circuit. Removal of the ringing control voltage turns off transistor Q13 and relay K1 releases, thereby producing the silent interval.

The action of charging and discharging capacitor C1 through resistor R24 in order to pass or inhibit scan interrogation pulses also serves to inhibit false responses due to noise pulses when a ringing signal is removed from the line. Thus during the on-time of ringing, diode CR3 is back-biased and the supervisory circuit is disconnected from the line. When ringing is removed a false off-hook indication may be provided which may appear to the supervisory circuit as a dial pulse make interval which it is required to pass. In order to pass a legitimate dial pulse but ignore the ringing noise pulse, the supervisory circuit is desensitized during the interval immediately following the release of ringing by charging capacitor C1 during ringing. Thus when ringing is applied, diode CR3 is back-biased and the diode side of capacitor C1 discharges through resistors R24 and R25 until transistor Q12 is turned on. If the line goes off-hook during ringing, the talking battery will override the ringing signal, forward-bias diode CR3 and thereby permit the off-hook indication to be transmitted to the scanner.

Figure 11A:
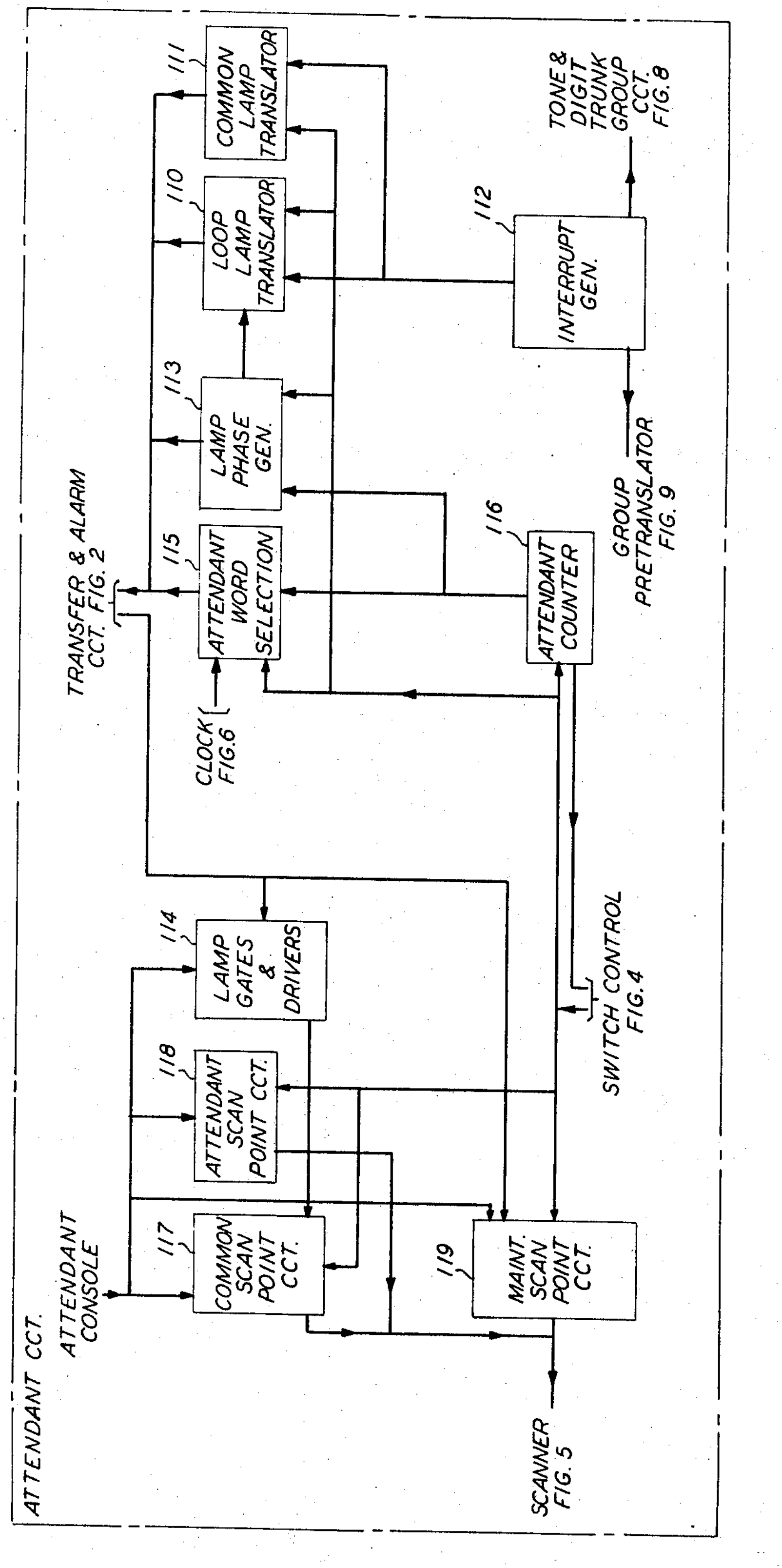

(12) Attendant circuit (FIG. 11)

Information for determining the status of attendant lamps is transmitted in coded form in messages from control unit 20 to switch unit 10. Upon receipt of a lamp message, FIG. 14A, from the control unit, switch control 4 will load the lamp information into an allocated portion of memory 31, FIG. 3; viz., words 72–87. These stored words, designated as attendant lamp words, are accessed sequentially during time slot 1, the data time slot reserved for attendant lamp messages. The lamp word format containing two loop lamp messages is depicted in FIG. 14D.

Attendant counter 116 in attendant circuit 11 comprises a binary counter having as many states as the number of attendant lamp words in memory 31. During the attendant time slot the state of attendant counter 116 is transmitted to store 3 via switch control 4 to establish which of the attendant lamp words in memory 31 will be accessed during the current attendant time slot. Attendant counter 116 is advanced prior to the appearance of the attendant time slot in each store cycle and, by cycling through its various states, serves to establish the required sequential access to the attendant lamp words. Selective access also is provided. For this purpose each stage of attendant counter 116 has inputs from switch control 4 which permit the setting of the counter to any desired state during the loading of lamp information into memory 31.

The particular accessed word is retrieved from memory 31 and registered in output register 40 in the attendant time slot. It is subsequently applied to loop and common lamp translators 110 and 111 dependent upon the type of message involved.

The use of logic circuitry in translators 110 and 111 to interrupt clock pulses at varying rates determined by the binary coded messages from output register 40, and to direct the resultant lamp control signals, e.g., dark, steady state, wink, et cetera, to the desired lamps, is of particular interest. Interrupt generator 112 provides low frequency timing signals which are applied to translators 110 and 111 where they are combined with the two binary coded attendant lamp messages of the lamp word received from output register 40 to produce lamp control signals. It may be noted from FIG. 14D that each of the pair of lamp messages contained in lamp word bits 8–15 and 16–23 comprises data for controlling the condition of a key lamp, a source lamp and a destination lamp. Thus, each lamp message applies to three distinct lamps, and each lamp word will produce six distinct lamp control signals.

These control signals are then combined with signals from lamp phase generator 113 so that each set of three lamp control signals for a particular message will be directed in alternate phases of the attendant time slot to latching power switches, in this instance, PNPN transistors, in lamp gates and drivers circuit 114 through transfer and alarm circuit 14. Each latching switch controls a distinct pair of lamps, which lamps are identified by one of the three lamp type designations in each of the two messages in an attendant lamp word. Thus, for example, one latching switch controls the two key lamps serving attendant loops 1 and 4.

Attendant counter 116 may be used to advantage in selecting the particular latching switch corresponding to the attendant lamp word designated by the current count. Thus, the stages of attendant counter 116 provide individual signal inputs to attendant word selection circuit 115 which uses them to gate the translated lamp control signals from translators 110 and 111 to the particular latching switch controlling the lamps designating the attendant lamps specified in the corresponding word in memory 31.

The output of the highest order stage of attendant counter 116 also provides the basic timing for operation of lamp phase generator 113. The lamp phase signals allow the state of two lamps to be controlled independently during a single time slot by alternately steering a pair of lamp control signals through a single latching switch. This operation also serves to interrupt the applied lamp control signal as desired. The lamp control signals are sufficient only to activate the latching switch, the switch then remaining latched for the balance of the currently applied lamp phase signal.

Figure 11B:
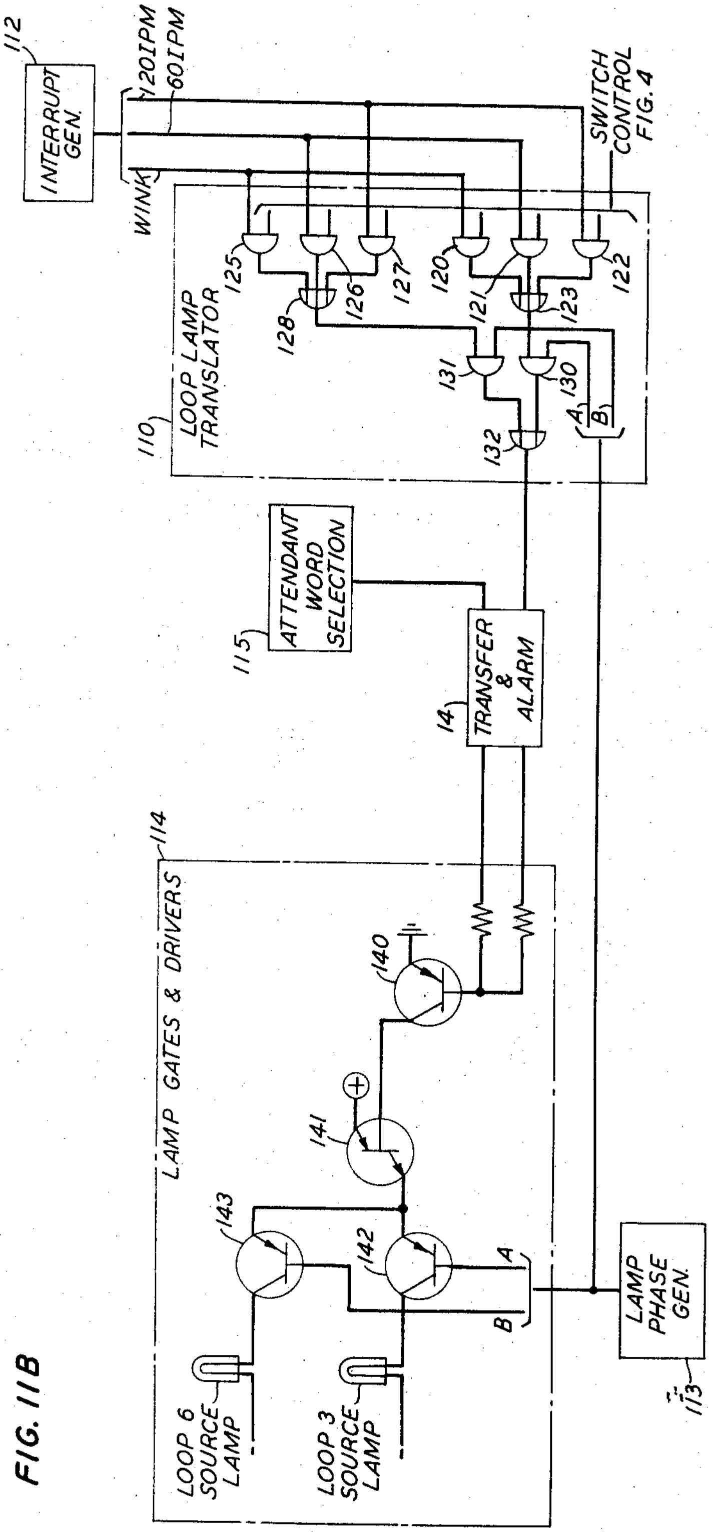

An example will assist in the understanding of this operation. For this purpose, FIG. 11B illustrates the specific circuitry required to process the destination lamp information contained in bits 8–10 and 16–18 of the two lamp messages in an attendant word, FIG. 14D. It will be appreciated that corresponding processing is being pursued concurrently for the key lamp and source lamp information contained in these two messages. As described in the aforementioned Gebhardt et al. patent, different flashing rates of the source lamp indicate to the attendant whether a call has originated from a line or a trunk in addition to the idle and talking state thereof. Thus four lamp flashing rates; viz., dark, steady and 60 and 120 interruptions per minute, are required to portray the current status of a particular attendant loop to the attendant.

Let us consider that attendant word 78 containing messages for loops 3 and 6, FIG. 3, is currently being observed in time slot 1 and further that the source lamp for loop 3 is in the steady state indicating a talking connection while the source lamp for loop 6 is flashing at 60 interruptions per minute indicating that a call is originating from a line.

The source code bits 16–18 for attendant loop 3, designating the steady state, are directed to AND gates 120–122, respectively. Similarly, the loop 6 source code in bits 11–13 are directed to AND gates 125–127. Signals establishing the lamp flashing rates are applied to these AND gates by interrupt generator 112 as shown in FIG. 11B. The wing signal is ¼ second on and 1¾ seconds off. It is combined with the 120 IPM signal to produce the steady state. As a result, AND gates 120 and 121 will pass signals which are combined in gate 123 to produce a steady state output to gate 130. Similarly, AND gate 126 will pass the 60 IPM signal through gate 128 to gate 131. Phase A and B signals from generator 113 are also applied to gates 130 such that the steady state and 60 IPM signals will be transmitted alternately through gate 132 and transfer and alarm circuit 14 to lamps gates and drivers circuit 114 where it is applied in common to the source lamp drivers for all attendant loops.

Concurrently, a signal from attendant word selection circuit 115 is applied to the specific source lamp driver for loops 3 and 6. As a result, gate transistor 140 is enabled causing PNPN driver transistor 141 to latch in its saturated state. This, in turn, permits current to flow through transistor 142 during lamp phase A to light the loop 3 source lamp in the steady state and through transistor 143 during lamp phase B to light the loop 6 source lamp at the 60 IPM rate. Once latched the PNPN is held operated for the duration of a phase A or B signal. A guard interval between phase A and B signals permits two lamps to be operated independently by the same driver since the PNPN will be turned off at this time.

All maintenance and attendant scan points for switch unit 10 are located in attendant circuit 11 including common scan point circuit 117, attendant scan point circuit 118 and maintenance scan point circuit 119. Each of these circuits comprises a transistor gate under the control of keys on the attendant console which may be interrogated by inputs from switch control 4. Operation of a key places the scan point in the off-hook state such that, upon receipt of the next interrogation pulse from scanner 5, an output pulse will be returned to scanner 5. The division of scan point circuits is thus on a functional basis rather than to indicate any distinction in operation. These functional distinctions are indicated in the description of switch control 4.

Figure 13:
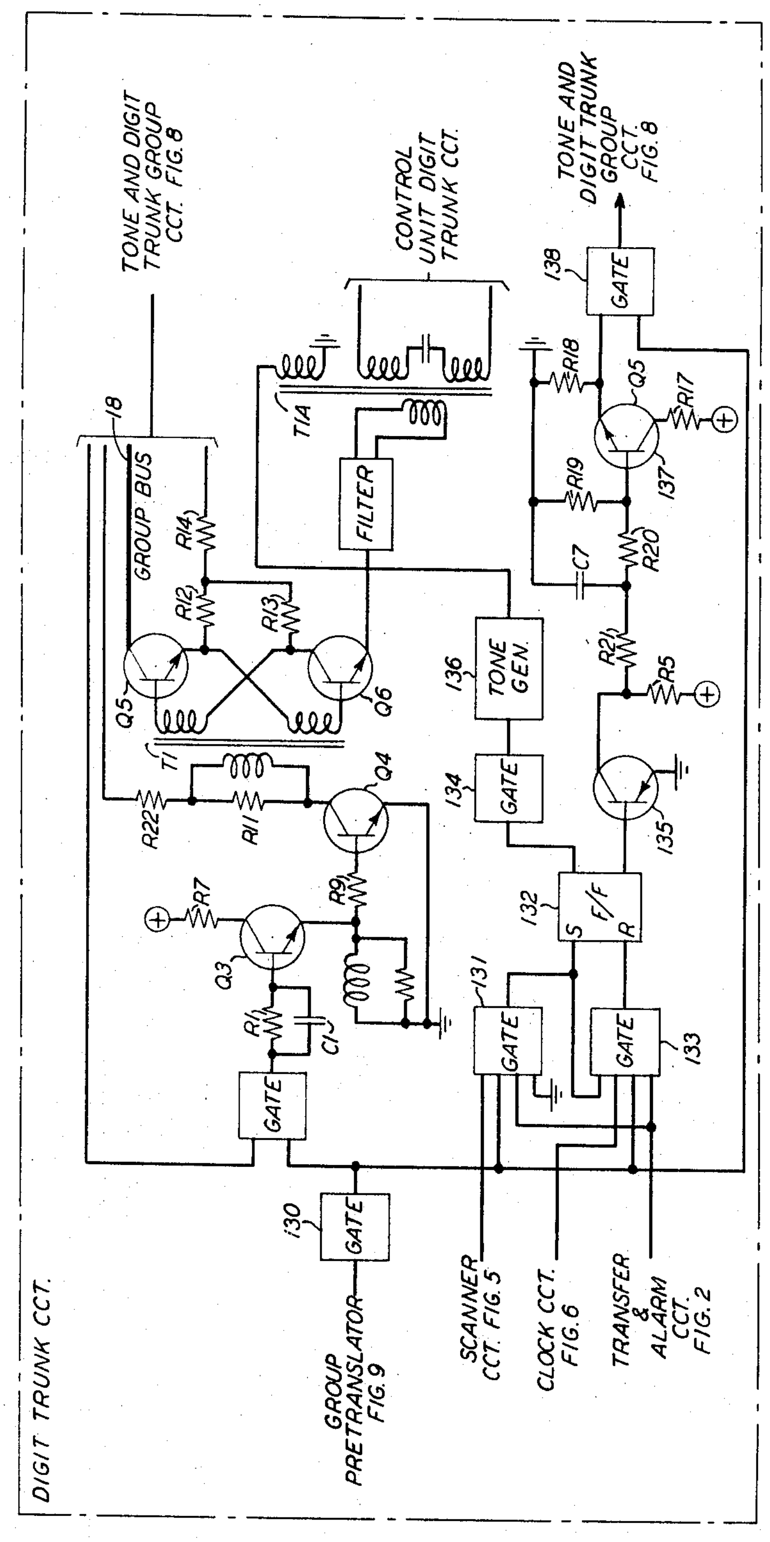

(13) Trunk circuits (FIG. 13)

The trunk circuits include the standard trunk 15, the digit trunk 13, FIG. 13, and the special service trunks 16. Each of these trunk circuits provides the usual connections between trunks and the time division buses. When two trunks or a trunk and line are connected to a common bus in the same time slot, bilateral transmission of speech and tones may take place. The time division switch in each trunk circuit is activated by gates whose inputs are provided through a selection matrix in the associated group circuit 12. As in the line circuit, these gates perform the final step in number translation preparatory to activation of the time division switch. The other transmission elements in the trunk circuit, viz., the low-pass filter and trunk transformer, correspond to those elements in the line circuit.

As in the line circuits, the supervisory state of each trunk is continuously monitored. When a trunk is off-hook, interrogation pulses are passed through the supervisory portion of the trunk circuit 15 to a scan bus which ultimately delivers the pulses to scanner 5. The dual function of a translator to select the desired time division switch and to deliver the interrogation pulse from scanner 5 to the corresponding supervisory circuit is utilized in the trunk circuit as in the line circuit. Thus, the trunk is addressed in the scan time slot, causing interrogation of the supervisory portion thereof. In order to avoid disturbance of a talking party by this interrogation pulse in a nontalking time slot, power is removed from all time division switch inputs during the scan time slot. The fact that the interrogate pulse is generated each time a trunk is connected during a talking time slot does not disturb the scanner since the scanner is only looking for a response during the scan time slot.

The interrogate pulse generated during a talking time slot advantageously is utilized to pass dial pulse information to the digit trunk via scanner 5. Thus when a calling line 10 or a standard trunk 15 is connected to a digit trunk 13 for signaling purposes, the interrogate pulses generated in successive appearances of the assigned time slot are gated through the supervisory portion of the calling line when it is off-hook and via the scan bus to the connected digit trunk. By detecting the envelope of the resultant train of interrogate pulses, the make and break intervals of each dial pulse can be reconstructed in the digit trunk circiut.

This latter operation may be seen from consideration of the digit trunk circuit in FIG. 13. Thus when the signaling party is off-hook, i.e., in a dial make interval, a signal from group pretranslator 9 through gate 130 during the talking time slot enables gate 131 in conjunction with the resultant interrogate signal transmitted through scanner 5. Enabled gate 131, in turn, sets flip-flop 132. When the signaling party is on-hook, i.e., in a dial break interval, the interrogate signal is not delivered through scanner 5, and gate 131 is disabled during the talking time slot. At this time gate 133 receives a clock signal which, in conjunction with the output of gate 130, resets flip-flop 132. Therefore, flip-flop 132 is set during the dial make interval and is reset during the dial break interval. The output of gate 130 also partially enables gate 138. With flip-flop 132 set, gate transistor 135 is enabled so that capacitor C7 is discharged and transistor 137 is turned off. This permits gate 138 to provide a signal during the talking time slot in each dial make interval.

These signals are directed through special group circuit 8 to scanner 5 to inhibit the application of scan interrogate pulses.

When a dial break occurs, flip-flop 132 is reset and transistor 135 is disabled so that capacitor C7 begins to charge. If the signaling party remains on-hook for less than a predetermined dial break interval, capacitor C7 will not charge sufficiently to turn on transistor 137. Thus during this on-hook interval, while capacitor C7 is charging, scan inhibit pulses continue to be transmitted from gate 138. If the on-hook time is more than dial break interval, indicating a disconnect, capacitor C7 charges sufficiently to turn on transistor 137, thereby disabling gate 138. At this time scan inhibit pulses will be removed, and scanner 5 resumes normal detection of the condition of the previously signaling line. Thus scanner 5 is prevented from detecting the on-hook condition during dialing by scan inhibiting pulses generated in digit trunk circuit 13.

When tone signaling is employed, digit trunk circuit 13 provides a direct connection between the signaling party and control unit 20, with bilateral transmission of audio tones taking place via time division bus 18. However, if dial pulse signaling is utilized, digit trunk circuit 13 serves to convert the dial pulses into tone bursts which the data links between switch unit 10 and control unit 20 are equipped to handle. For this purpose the digit pulses reflected by the interrogate signals received from scanner 5 are transmitted to the digit trunk via tone generator 136. It is noted that flip-flop 132 is again utilized during this operation. If the signaling party is off-hook, dial make interval, flip-flop 132 is set and tone generator 136 is inhibited. When the signaling party goes on-hook, dial break interval, flip-flop 132 is reset, gate 134 is enabled, and tone generator 136 functions normally. Thus a tone burst represents an off-hook to on-hook transition and accurately reflects a dial pulse.

Special service trunks 16 consist of a standard trunk circuit 15, together with special supervisory circuitry and an adapter for the electromechanical equipment involved in the special service to be rendered, such as code call, telephone dictation or paging. Thus special service trunk 16 provides the interface between the talking bus and the electromechanical circuit employed by the system. The standard trunk circuit 15 provides the time division switch, filter and transformer necessary to allow audio signals to be transmitted between the bus and electromechanical equipment. However, the normal scan output circuitry is disabled by the special service supervisory circuit which provides its own scan point. Such a scan point is active only during the scanning time slot and is accessed at the time the special service trunk is scanned, thus allowing the talking time slot scan to be under the control of the party utilizing the special service. By monitoring the present state flip-flop in scanner 5 during the talking time slot, the special service trunk circuit 16 can determine the present state of the line to which it is connected. If the line is off-hook, trunk circuit 16 transmits scan inhibit pulses to scanner 5 during the talking time slot. This prevents scanner 5 from interrogating the calling line and allows the calling line to control the electromechanical equipment associated with a special service trunk by dialing without having the scanner send change of state messages to the control unit.

(14) Transfer and alarm circuit (FIG. 2)

The transfer and alarm circuit 14 switches circuits in or out of operation in switch unit 10 in response to data messages or direct-current signals from control unit 20. Such messages result from information concerning the status of switch unit circuits transmitted to control unit 20 via scanner 5. The transfer and alarm circuit comprises logic circuits for performing various translations and relays for performing major switching functions.

When a switch unit trouble condition is discovered by automatic test routines performed periodically on each component in the switch unit, redundant components are interchanged between on-line and off-line service until a satisfactory working mode is achieved. These transfers may be performed by the use of the normal data handling circuits in the switch unit or, in the event trouble conditions prohibit the reliable use of this method, a direct-current controlled transfer is performed. The former method utilizes messages transmitted from the control unit. If the incoming message concerns a transfer function, the address portion of the message, bits 4 through 9, FIG. 14A, will contain a unique address identified only with the transfer and alarm circuit. The message itself will be duplicated in both the calling and called party portions of the incoming message, which duplicate messages are compared in transfer and alarm circuit 14. If they are identical, the message is translated and stored pending receipt of a clock signal in the appropriate time interval which will permit the designated transfer function to be initiated.

In the event that a failure precludes the use of the normal data message transfer operations, a relay controlled transfer is employed in order to restore the switch unit to a working mode. This technique simultaneously interchanges those duplicated portions of the switch unit in which failures are most likely to result in a total lack of response to automatic testing routines performed under the direction of the control unit. These portions include clock 6, data modem 50, control portions of transfer and alarm circuit 14, and the actual data link with the control unit. In this instance a relay in the data link normally receives direct-current voltage and is in the operated condition. The major transfer operation is initiated by removing the direct-current voltage from this relay. Upon its release, a series of other relays operate to break the connection between data modem 50 and the associated data link. Instead, the data link is now connected to a digit trunk and the previously off-line data modem 50 is connected through contacts on the digit trunk to the control unit through the data link. Similarly, transfers of other components result in a complete interchange of the critical, redundant circuits and their association with the control unit through a digit trunk.

Scan points in attendant circuit 11 continuously monitor certain check points in transfer and alarm circuit 14 in order to assure that the appropriate transfer operations are reported and performed.

(15) Data modem (FIG. 5)

The data modem 50 illustrated in FIG. 5 forms an interface between the data links from the control unit and the switch unit. Digital information from the switch unit is converted in data transmitter 51 to frequency shift signals for transmission to a data receiver in control unit 20 via the data link. Similarly, incoming frequency shift signals are converted in data receiver 52 to logic signals compatible with the logic circuitry in switch unit 10. Timing signals are also recovered and provide bit regeneration and timing information to the switch unit.

The receiver comprises a timing counter which is reset at its transition from a zero to a one in an incoming message. It is driven by an oscillator which permits provision of the desired length of each bit delivered to switch control 4.

The data transmitter 51 contains a multivibrator responsive to the input logic information to operate at two distinct frequencies. A mark or ONE signal produces an 1150 cycle per second tone and a space or ZERO signal produces an 1850 cycle per second tone.

Figure 6:
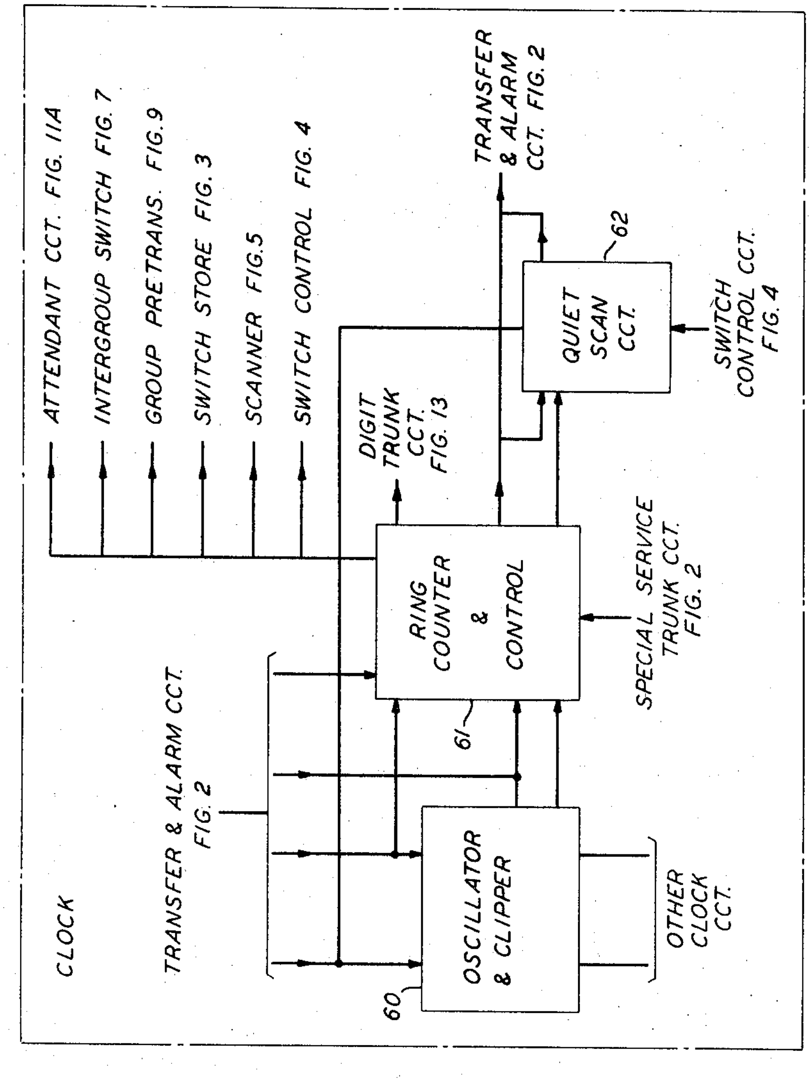

(16) Clock (FIG. 6)

The clock 6 comprises an oscillator and clipper circuit 60 which provides pulses to a ring counter 61 at a precisely controlled rate. Eight clock phases are delivered by ring counter 61 which also generates the required fanout of the signals to all components in the switch unit. The pulse which determines the resonant transfer interval for switching audio signals to and from the time division buses is developed separately and is adjustable. It is produced twice during each cycle of clock operation.

Also developed by clock 6 is the quiet scan signal generated in quiet scan circuit 62 which is of particular interest in the instant invention. This signal is of like duration but of opposite polarity to the time division switch closure signal and occurs only during the scan time slot. This signal is directed to the particular circuits concerned with time division switch operation in order to prevent closure of the time division switches during the scan time slot.

It is to be understood that the above-described arrangement is illustrative of the application of the principles of the invention. Numerous other arrangements may be devised by those skilled in the art without departing from the spirit and scope of the invention.

What is claimed is:

1. A communication system comprising a plurality of lines, a control unit for recording the status of calls and for directing line interconnections, a remote switch unit comprising a memory, a switching network terminating said lines and responsive to signals developed from line identities stored in said memory for interconnecting an active pair of said lines, scanning means comprising means for detecting the supervisory state of each of said lines, means for storing the detected line state in said memory and means for comparing the stored line state with the current scan state to determine each change in line state, means for transmitting a line state change message from said memory to said control unit for processing, and means for transmitting a line connection message from said control unit to said memory pursuant to the establishment of the connection of said active pair of lines.

2. A communication system comprising a plurality of lines, a control unit, a switch unit remote from said control unit and comprising a single memory storing the supervisory state of each of said lines and the identity of each pair of lines active on a call connection, a switching network responsive to control signals developed from the line identities stored in said memory for interconnecting active pairs of said lines, scanning means for determining the current supervisory state of each of said lines and for storing said line states in said memory, and means for transmitting change of state messages from said memory to said control unit and line identity messages from said control unit to said memory to establish a call connection.

3. A communication system comprising a plurality of lines, a switch unit terminating said lines and a remote control unit for recording the status of system calls and for directing all line interconnections, said switch unit comprising a line scanning circuit, a common bus, a switching network for connecting said lines to said bus and a memory storing information from said scanning circuit concerning the current supervisory state of each line and information from said control unit concerning each active pair of lines to be interconnected by said switching network.

4. A communication system in accordance with claim 3, wherein said memory comprises a plurality of distinct word storage areas and further comprising means for enabling the storage and retrieval of words in distinct time slots of a repetitive cycle of time slots, said enabling means comprising means responsive to receipt of a message from said control unit for addressing said memory in a first time slot to store the designations of a calling line and a called line in a first sequence of said word storage areas, means for addressing said memory during a corresponding talking time slot in a succession of said time slots in each cycle, means to retrieve each of the line designation words from said first sequence of storage areas and means for translating each of said line designation words into switch control signals and for applying the resultant switch control signals to the corresponding line circuits, said line circuits being responsive to said switch control signals to complete a talking path between the associated lines via said common bus during the corresponding talking time slot.

5. A communication system in accordance with claim 4 and further comprising means for addressing said memory in a second time slot to store an indication of the state of each of a plurality of scan points in a second sequence of word storage areas and means for retrieving each of the scan point state indications from said second sequence of word storage areas in succession during said second time slot in a corresponding succession of cycles.

6. A communication system in accordance with claim 5 and further comprising means for applying a switch control signal to the line circuit corresponding to said scan point state indication through said translating and applying means, said line circuits being responsive to said switch control signals during said second time slot to inhibit connection of the corresponding lines to said common bus.

7. A communication system in accordance with claim 6, wherein said scanning circuit comprises means for comparing the retrieved scan point state indication with the present state of the corresponding scan point, and further comprising means for transmitting a message to said control unit during said second time slot in succeeding cycles identifying a scan point which the comparison indicates has changed state.

8. A communication system in accordance with claim 4 and further comprising an attendant's console having a plurality of visual display lamps to indicate to the attendant via distinct line loops the current condition of calls involving the attendant, means for addressing said memory in a third time slot to store designations of the state of each of said lamps in a third sequence of word storage areas and means for retrieving each of the lamp words from said third sequence during a corresponding attendant time slot in a succession of said time slots, means for translating each of said lamp designation words into lamp control signals, and means for utilizing the resultant lamp control signals to produce the desired visual display in the corresponding lamps.

9. A communication system in accordance with claim 8, wherein each of said lamp words contains lamp designations for two of said line loops, said lamp control signal utilizing means comprising means for independently operating a designated pair of said lamps during said attendant time slot.

10. A communication system in accordance with claim 9, wherein said operating means comprises a latching switch, a lamp power source, means for applying a pair of lamp control signals to said latching switch in first and second portions of said attendant time slot to enable said switch during said distinct portions and means for steering signals from said lamp power source through said enabled latching switch to one of said pair of lamps in said first portion and to the other of said pair of lamps in said second portion.

11. A communication system comprising a plurality of lines, a switch unit terminating said lines, a console comprising visual display lamps and a remote control unit for recording the status of system calls and for directing all line interconnections, said switch unit comprising a common bus, a switching network for connecting said lines to said bus, and a memory storing messages from said control unit concerning each active pair of lines to be interconnected by said switching network and the desired state of each of said lamps.

12. A communication system in accordance with claim 11, wherein said memory comprises a plurality of distinct word storage areas and further comprising means for addressing said memory for retrieval of lamp words in a distinct time slot of a repetitive cycle, means for translating a retrieved lamp word into first and second lamp control signals, a lamp driver circuit for each pair of lamps on said console, means for applying each pair of lamp control signals to a corresponding one of said lamp driver circuits in respective first and second phases of said distinct time slot, means for steering a lamp lighting signal coded in accordance with said first lamp control signal to one of said pair of lamps in said first phase, and means for steering said lamp lighting signal coded in accordance with said second lamp control signal to the other one of said pair of lamps in said second phase.

13. In a communication system, a plurality of lines, a switch terminating each line, a common bus, means for connecting active pairs of said lines to said common bus during corresponding talking time slots in a repetitive cycle of time slots comprising means for applying enabling signals to the corresponding line switches, means for scanning said lines in sequence during a scanning time slot in said repetitive cycle to determine the supervisory state of each line, means for applying said enabling signals to said scanning means, and means for applying an inhibit signal to the corresponding line switch during said scanning time slot.

14. In a communication system, a plurality of lines, a common bus, means for applying a control signal to selected lines during each time slot in a recurrent cycle of time slots, a line switch terminating each of said lines and responsive to receipt of said control signal to connect the corresponding line to said common bus, a supervisory circuit connected to each of said lines and responsive to receipt of said control signal to determine the present supervisory state of the corresponding line, and means for disabling said line switches during a distinct one of said time slots in each cycle reserved for said present supervisory state determination.

15. A communication system comprising a plurality of switch units each terminating a distinct plurality of lines, a single control unit common to said switch units for controlling the establishment of connections between calling and called lines, each of said switch units comprising a plurality of group buses arranged to serve distinct groups of said lines, means responsive to receipt in the switch unit of a message from said control unit for connecting a calling line and a called line to the associated group buses during a selected time slot in a repetitive cycle, an intergroup bus, and means responsive to receipt of said message for connecting said associated group buses to said intergroup bus during said selected time slot.

16. A communication switching system comprising a plurality of lines, a control unit, a switch unit remote from said control unit, and data transmission means for transmitting control data between said control and switch units; said switch unit comprising a first and a second time division bus and time division means for interconnecting said buses, a single common memory for said first bus, said second bus, and said interconnecting means, means including said common memory and responsive to certain of said control data for establishing connections between said buses and said interconnecting means in predetermined talking time slots, means including said common memory for scanning said lines during a scanning time slot, and means for preventing establishment of said connections during said scanning time slot.

17. A switch unit for a time division communication switching system comprising a plurality of lines, a first and a second time division bus and means for interconnecting said buses, means for scanning said lines, means for establishing connections in predetermined time slots between said lines, said establishing means including said first and second buses and said interconnecting means, a common memory for said first and second buses, said interconnecting means, and said scanning means, means responsive to said scanning means for storing in said common memory information concerning the supervisory state of each line, and means including information in said common memory concerning each pair of lines to be connected together for controlling said means for establishing connections.

No references cited.

WILLIAM C. COOPER, *Primary Examiner.*